US012196295B2

(12) United States Patent
Asai et al.

(10) Patent No.: US 12,196,295 B2
(45) Date of Patent: Jan. 14, 2025

(54) TRANSMISSION DEVICE

(71) Applicant: MUSASHI SEIMITSU INDUSTRY CO., LTD., Toyohashi (JP)

(72) Inventors: Ryosuke Asai, Toyohashi (JP); Shinya Matsuoka, Toyohashi (JP); Kazuma Oyaizu, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 18/283,307

(22) PCT Filed: Mar. 26, 2021

(86) PCT No.: PCT/JP2021/013095
§ 371 (c)(1),
(2) Date: Sep. 21, 2023

(87) PCT Pub. No.: WO2022/201539
PCT Pub. Date: Sep. 29, 2022

(65) Prior Publication Data
US 2024/0167547 A1 May 23, 2024

(51) Int. Cl.
*F16H 57/04* (2010.01)
*F16H 37/08* (2006.01)
(Continued)

(52) U.S. Cl.
CPC ........... *F16H 37/082* (2013.01); *F16H 48/08* (2013.01); *F16H 48/40* (2013.01); *F16H 57/037* (2013.01);
(Continued)

(58) Field of Classification Search
CPC ........ F16H 37/082; F16H 48/08; F16H 48/40; F16H 57/037; F16H 57/0402;
(Continued)

(56) References Cited

U.S. PATENT DOCUMENTS 2,858,714 A 11/1958 Black
5,533,943 A 7/1996 Ichioka et al.
(Continued)

FOREIGN PATENT DOCUMENTS

CN 108202595 A * 6/2018 ............... B60K 1/00
DE 10 2018 215 933 A1 3/2020
(Continued)

OTHER PUBLICATIONS

Office Action, Notice of Reasons for Refusal, issued on Feb. 13, 2024 in the corresponding Japanese patent application No. 2003-508408 with the machine-generated English translation.
(Continued)

*Primary Examiner* — Justin Holmes
(74) *Attorney, Agent, or Firm* — Carrlar, Shande & Associates P.C.; Joseph P. Carrier; Fulchand P. Shende

(57) ABSTRACT

Provided is a transmission device including a differential case. The differential case includes at least a part of a contamination pouch. The contamination pouch includes an inlet facing into a body part of the differential case and capable of collecting a contamination in an oil inside the body part. In an inner surface of the differential case, the inlet is arranged in a largest inner diameter part on which a largest centrifugal force acts during rotation of the differential case, or arranged closer to an oil discharging port with respect to the largest inner diameter part in an axial direction.

14 Claims, 14 Drawing Sheets

(51) Int. Cl.
  *F16H 48/08* (2006.01)
  *F16H 48/40* (2012.01)
  *F16H 57/037* (2012.01)
  *F16H 57/02* (2012.01)
(52) U.S. Cl.
  CPC ..... *F16H 57/0402* (2013.01); *F16H 57/0424* (2013.01); *F16H 57/0483* (2013.01); *F16H 2057/02052* (2013.01)
(58) Field of Classification Search
  CPC .............. F16H 57/0424; F16H 57/0483; F16H 2057/02052
  See application file for complete search history.

(56) References Cited

U.S. PATENT DOCUMENTS

| | | | |
|---|---|---|---|
| 5,643,127 | A | 7/1997 | Yoshii et al. |
| 7,549,940 | B2 | 6/2009 | Kira et al. |
| 8,727,928 | B2 * | 5/2014 | Harashima ............ F16H 37/082 475/221 |
| 11,279,218 | B2 | 3/2022 | Hibino et al. |
| 2011/0207570 | A1 | 8/2011 | Tanaka et al. |
| 2018/0106357 | A1 | 4/2018 | Kawakami et al. |
| 2018/0328480 | A1 | 11/2018 | Nakano et al. |
| 2020/0025285 | A1 | 1/2020 | Matsuoka |
| 2021/0234435 | A1 | 7/2021 | Hibino et al. |

FOREIGN PATENT DOCUMENTS

| | | |
|---|---|---|
| DE | 10 2019 119 866 A1 | 6/2020 |
| JP | H03-11163 U | 2/1991 |
| JP | H05-046506 Y2 | 12/1993 |
| JP | H06-010655 U | 2/1994 |
| JP | H09-72405 A | 3/1997 |
| JP | 2002070996 A * | 3/2002 ......... F16H 57/0483 |
| JP | 2011-174583 A | 9/2011 |
| JP | 2011-174584 A | 9/2011 |
| JP | 2018-063037 A | 4/2018 |
| JP | 2018-128078 A | 8/2018 |
| JP | 2018-189135 A | 11/2018 |
| JP | 2018-189179 A | 11/2018 |
| JP | 2020-106046 A | 7/2020 |
| JP | 2020-122531 A | 8/2020 |
| JP | 2020-133775 A | 8/2020 |
| WO | 2018/077688 A1 | 5/2018 |

OTHER PUBLICATIONS

PCT/ISA/210 from related International Application PCT/2021/013093.
Written Opinion of the International Searching Authority for related International Application PCT/2021/013093.
PCT/ISA/210 From related International Application PCT/2021/013094.
Written Opinion of the International Searching Authority for related International Application PCT/2021/013094.
PCT/ISA/210 from corresponding International Application PCT/2021/013095.
Written Opinion of the International Searching Authority for corresponding International Application PCT/2021/013095.
PCT/ISA/210 from related International Application PCT/2021/013096.
Written Opinion of the International Searching Authority for related International Application PCT/2021/013096.
Office Action issued on Apr. 10, 2024 in the corresponding U.S. Appl. No. 18/283,541.
Non-Final Office Action dated Nov. 13, 2024 issued in a corresponding U.S. Appl. No. 18/283,528.

* cited by examiner

TRANSMISSION DEVICE

TECHNICAL FIELD

The present invention relates to a transmission device, and in particular to a transmission device comprising a transmission case and a differential device whose differential case rotates inside the transmission case, in which the differential case includes a body part housing a differential mechanism therein and capable of storing an oil; an oil introducing port open to one side in an axial direction of the differential case and capable of introducing the oil inside the transmission case into the body part; and an oil discharging port open to the other side in the axial direction of the differential case and capable of discharging a stored oil inside the body part into the transmission case.

In the present invention and the specification, the term "axial direction" means a direction along a rotation axis (a first axis in an embodiment) of the differential case, and the term "circumferential direction" means a circumferential direction of the differential case about the rotation axis as a center axis.

Furthermore, in the present invention and the present specification, the term "contam" is an abbreviation for contamination, and refers to metal powder to be mixed with the oil inside the transmission case and other fine foreign substances with a larger specific gravity than the oil.

BACKGROUND ART

The aforementioned transmission device has been already known as disclosed in Patent Document 1 below.

PRIOR ART DOCUMENTS

Patent Documents

Patent Document 1: Japanese Unexamined Patent Application Publication No. H9-72405

SUMMARY OF THE INVENTION

Problems to be Solved by the Invention

In the transmission device of Patent Document 1, if the contam remaining in the stored oil inside the body part of the differential case continues to increase without being discharged to an outside of the differential case, there is a possibility that the contam diffuses inside the differential case during transmission and degrades a performance of the differential device. However, there is no technical means for suppressing such diffusion of the contam.

The present invention is proposed in light of the foregoing, and aims to provide a transmission device that can solve the problem of the conventional device by suppressing diffusion of a contam inside a differential case or making it easy to discharge the contam to an outside of the differential case in addition to suppression of the diffusion of the contam.

Means for Solving the Problems

In order to achieve the above-described object, the present invention has a first feature to provide a transmission device comprising a transmission case and a differential device whose differential case rotates inside the transmission case. The differential case includes a body part housing a transmission mechanism therein and capable of storing an oil; an oil introducing port open to one side in an axial direction of the differential case and capable of introducing the oil inside the transmission case into the body part; and an oil discharging port open to the other side in the axial direction of the differential case and capable of discharging a stored oil inside the body part into the transmission case. The differential case comprises at least a part of a contamination pouch including an inlet facing into the body part and capable of catching a contamination in the oil inside the body part. In an inner surface of the differential case, the inlet is arranged in a largest inner diameter part on which a largest centrifugal force acts during rotation of the differential case, or arranged closer to the oil discharging port with respect to the largest inner diameter part in the axial direction.

In addition to the first feature, the present invention has a second feature in which a peripheral part of the inlet is provided with a protruding part closing a part of the inlet.

In addition to the first or second feature, the present invention has a third feature in which the differential case is coupled to a carrier of a gear reducer for outputting a rotational force to the differential case, and the contamination pouch is formed so as to bridge over the carrier and the differential case.

In addition to any one of the first through third features, the present invention has a fourth feature in which the differential case is coupled to a carrier of a gear reducer for outputting a rotational force to the differential case. Between the carrier and the differential case, at least the differential case is recessed in the axial direction in a joining surface thereof with respect to the carrier to thereby define the contamination pouch between the carrier and the differential case.

In addition to the second feature, the present invention has a fifth feature in which the differential case is configured to be divided into first and second cases joined to each other. At least a part of the contamination pouch is formed in the first case, and the protruding part is formed in the second case.

In addition to any one of the first through fifth features, the present invention has a sixth feature in which the differential mechanism comprises paired side gears rotatably supported by the differential case; two or more pinion gears meshing with the paired side gears; and a pinion gear support surface formed in an inner surface of the differential case so as to support back surfaces of the pinion gears. The pinion gear support surface and the contamination pouch are arranged at respective positions spaced apart from each other in a circumferential direction of the differential case.

Effects of the Invention

According to the first feature, in the transmission device in which the differential case includes the body part capable of storing the oil; the oil discharging port open to the one side in the axial direction; and the oil introducing port open to the other side in the axial direction, the differential case comprises at least the part of the contamination pouch including the inlet facing into the body part and capable of catching the contamination in the oil inside the body part. In the inner surface of the differential case, the inlet is arranged in the largest inner diameter part on which the largest centrifugal force acts, or arranged closer to the oil discharging port with respect to the largest inner diameter part. Consequently, particularly in a structure of arranging the inlet in the largest inner diameter part, since the contamination mixed with the oil inside the body part can be effectively collected in the contamination pouch due to the centrifugal force during the rotation of the differential case, diffusion of the contamination inside the body part can be suppressed. Furthermore, the contamination collected in the largest inner diameter part due to the centrifugal force easily flows toward the oil discharging port together with the oil flowing from the oil introducing port to the oil discharging port. Thus, the contamination can also be effectively collected in the contamination pouch by arranging the inlet closer to the oil discharging port with respect to the largest inner diameter part. Consequently, since the diffusion of the contamination is suppressed, a resulting degradation of a performance of the differential device can be effectively suppressed.

According to the second feature, since the peripheral part of the inlet of the contamination pouch is provided with the protruding part closing the part of the inlet, the contamination to flow out from the inlet is caught on the protruding part even when the inlet is temporarily oriented downward in association with the rotation of the differential case. Therefore, it is possible to effectively inhibit the contamination from exiting the contamination pouch.

According to the third feature, since the differential case is coupled to the carrier of the gear reducer for outputting the rotational force to the differential case, and the contamination pouch is formed so as to bridge over the carrier and the differential case, the part of the contamination pouch is formed not only in the differential case, but also in the carrier of the gear reducer. Therefore, a capacity of the contamination pouch can be easily increased by utilizing the carrier of the gear reducer.

According to the fourth feature, between the carrier of the gear reducer and the differential case, at least the differential case is recessed in the axial direction in the joining surface thereof with respect to the carrier to thereby define the contamination pouch between the carrier and the differential case. Consequently, when processing or forming of the contamination pouch is performed, it can be easily performed in the joining surface in a state where the carrier is separated from the differential case so as to make the joining surface widely open toward the outside. Therefore, even when a bottom part of the contamination pouch is large in width and the inlet is small in width, the processing or forming can be quickly and accurately performed.

According to the fifth feature, the differential case is configured to be divided into the first and second cases joined to each other, and at least the part of the contamination pouch is formed in the first case and the protruding part is formed in the second case. Thus, the protruding part, which narrows the inlet of the contamination pouch, can be easily formed in the second case in a separated state from the first case forming at least the part of the contamination pouch. Accordingly, the protruding part can be significantly easily processed or formed as compared to a structure of forming the protruding part as well as the contamination pouch in the first case.

According to the sixth feature, the pinion gear support surface supporting the pinion gears and the contamination pouch are arranged at the respective positions spaced apart from each other in the circumferential direction of the differential case. This eliminates a possibility of reducing a thickness of the pinion gear support surface of the differential case for forming the contamination pouch and therefore, the differential case can achieve sufficient supporting rigidity for the back surfaces of the pinion gears even when the contamination pouch is specially provided.

EXPLANATION OF REFERENCE NUMERALS

A . . . transmission device, C . . . carrier, D . . . differential device, R . . . gear reducer, 10 . . . transmission case, 20 . . . differential case, 20A . . . first case, 20B, 20B', 20B" . . . second case, 20a . . . body part, 20i, 20o . . . oil introducing port, oil discharging port, 20d . . . largest inner diameter part of differential case, 20pf . . . pinion gear support surface, 21 . . . differential gear mechanism as differential mechanism, 23 . . . pinion gear, 24 . . . side gear, 70 . . . contamination pouch, 70i . . . inlet of contamination pouch, 70k . . . protruding part

MODE FOR CARRYING OUT THE INVENTION

First, reference is made to FIGS. 1 through 9 to describe a first embodiment.

First Embodiment

Figure 1:
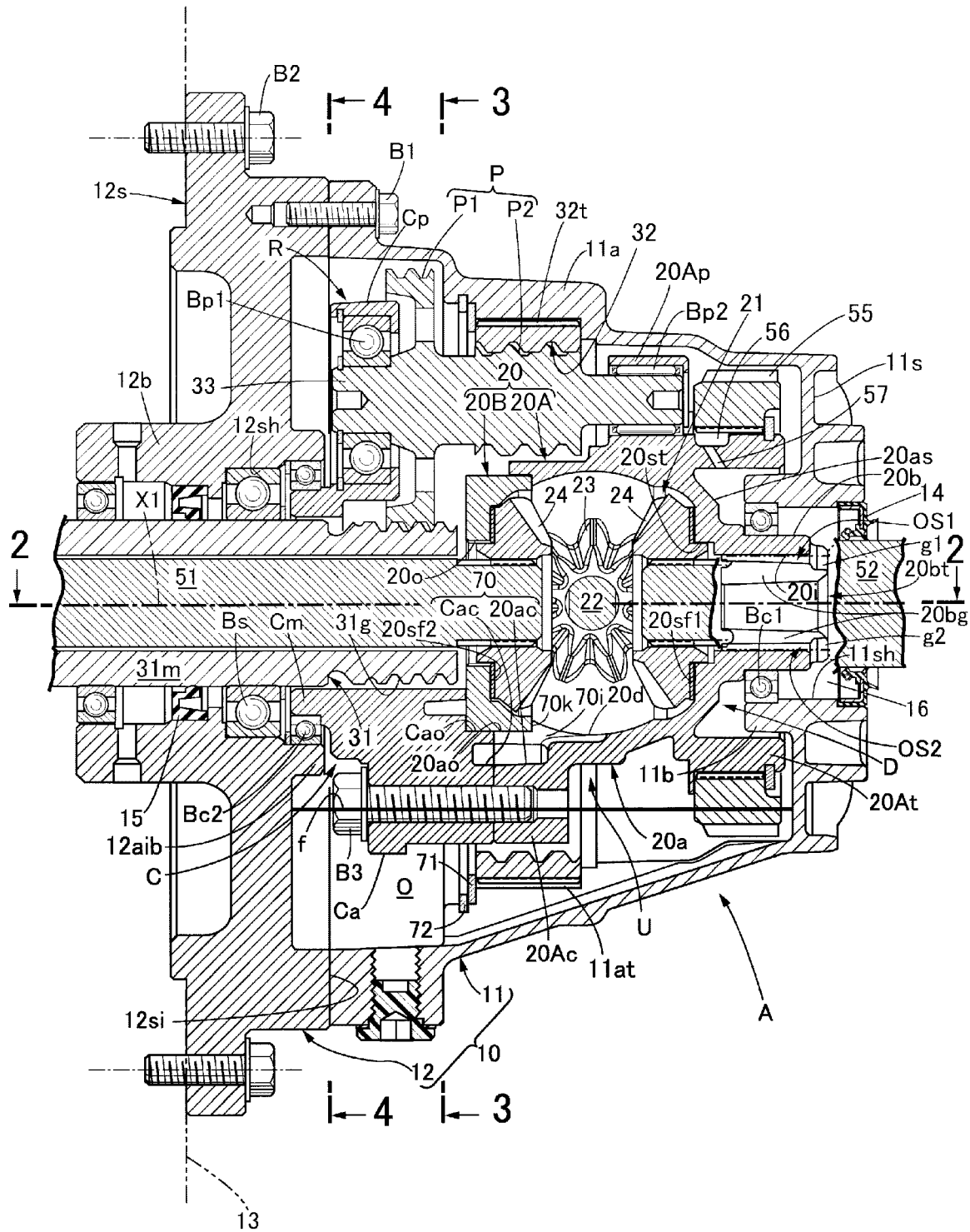
FIG. 1 is a vertical sectional view showing a whole transmission device according to a first embodiment of the present invention (a first embodiment).

In FIG. 1, there is provided a transmission device A mounted in a vehicle, for example, an automobile. The transmission device A comprises a transmission case 10 fixed to and supported by a supporting part 13 (for example, a vehicle body) and a single transmission unit U housed inside and supported by the transmission case 10. A bottom part inside the transmission case 10 functions as an oil storing part O that can store a lubricant oil at a specific oil storing surface f when the transmission unit U is in a stationary state.

The transmission unit U is a single unit combining a gear reducer R and a differential device D together. The gear reducer R consists of a planetary gear mechanism for decelerating a motive power from a not-shown power source (for example, an in-vehicle electric motor) and transmitting the same. The differential device D distributes an output from the gear reducer R and transmits the same to first and second output shafts 51 and 52 while allowing the first and second output shafts 51 and 52 to rotate at different speeds. A carrier C of the gear reducer R and the differential device D rotate integrally about a first axis X1. The first and second output shafts 51 and 52 rotate left and right driving wheels in association with each other via a not-shown interlocking mechanism.

The differential device D is arranged on only one side (right side in FIG. 1 (the same applies hereinafter)) in an axial direction of the transmission unit U, and the gear reducer R is arranged on only the other side (left side in FIG. 1 (the same applies hereinafter)) in the axial direction of the transmission unit U.

The transmission case 10 is configured to be divided, in the axial direction, into, for example, a case body 11 having a cylindrical shape with a bottom and a lid 12 closing an open end of the case body 11. The case body 11 is formed such that a body part 11*a* thereof has a diameter gradually decreasing (partly in phases in an illustrated example) toward a first end wall part 11*s* on the one side in the axial direction.

The first end wall part 11*s* is a part of one side wall of the transmission case 10 and includes a through hole 11*sh* in a center part thereof in the axial direction. The first end wall part 11*s* is integrally provided with, in a periphery of the through hole 11*sh*, a boss part 11*b* protruding therefrom. The boss part 11*b* has a cylindrical shape and extends inwardly in the axial direction. In the through hole 11*sh*, an intermediate portion of the second output shaft 52 is fitted and inserted via an oil seal 14. The boss part 11*b* is one example of the first boss. The boss part 11*b* may be provided to the first end wall part 11*s* in a protruding manner so as to extend outwardly in the axial direction.

Furthermore, the lid 12 mainly includes a second end wall part 12*s* having a disc-like shape. The second end wall part 12*s* is detachably joined to the open end of the case body 11 with two or more bolts B1. The second end wall part 12*s* is a part of the other side wall of the transmission case 10. The second end wall part 12*s* includes a through hole 12*sh* in a center part thereof in the axial direction. The second end wall part 12*s* is integrally provided with, in a periphery of the through hole 12*sh*, a boss part 12*b* protruding therefrom. The boss part 12*b* has a cylindrical shape and extends outwardly in the axial direction. The second end wall part 12*s* is one example of the facing end wall part that faces the gear reducer R. The second end wall part 12*s* has an outer circumferential portion detachably fixed to the supporting part 13 with two or more bolts B2.

A most part of the transmission unit U is supported rotatably about the first axis X1 by the first and second end wall parts 11*s* and 12*s* of the transmission case 10 via first and second unit support bearings Bc1 and Bc2. The first axis X1 is a rotation axis of the transmission unit U, which coincides with rotation axes of the differential case 20 and the carrier C to be described later.

In a state where the lid 12 is removed from the case body 11, the transmission unit U can be placed and assembled inside the case body 11 through the open end of the case body 11 from an outer side in the axial direction.

Figure 2:
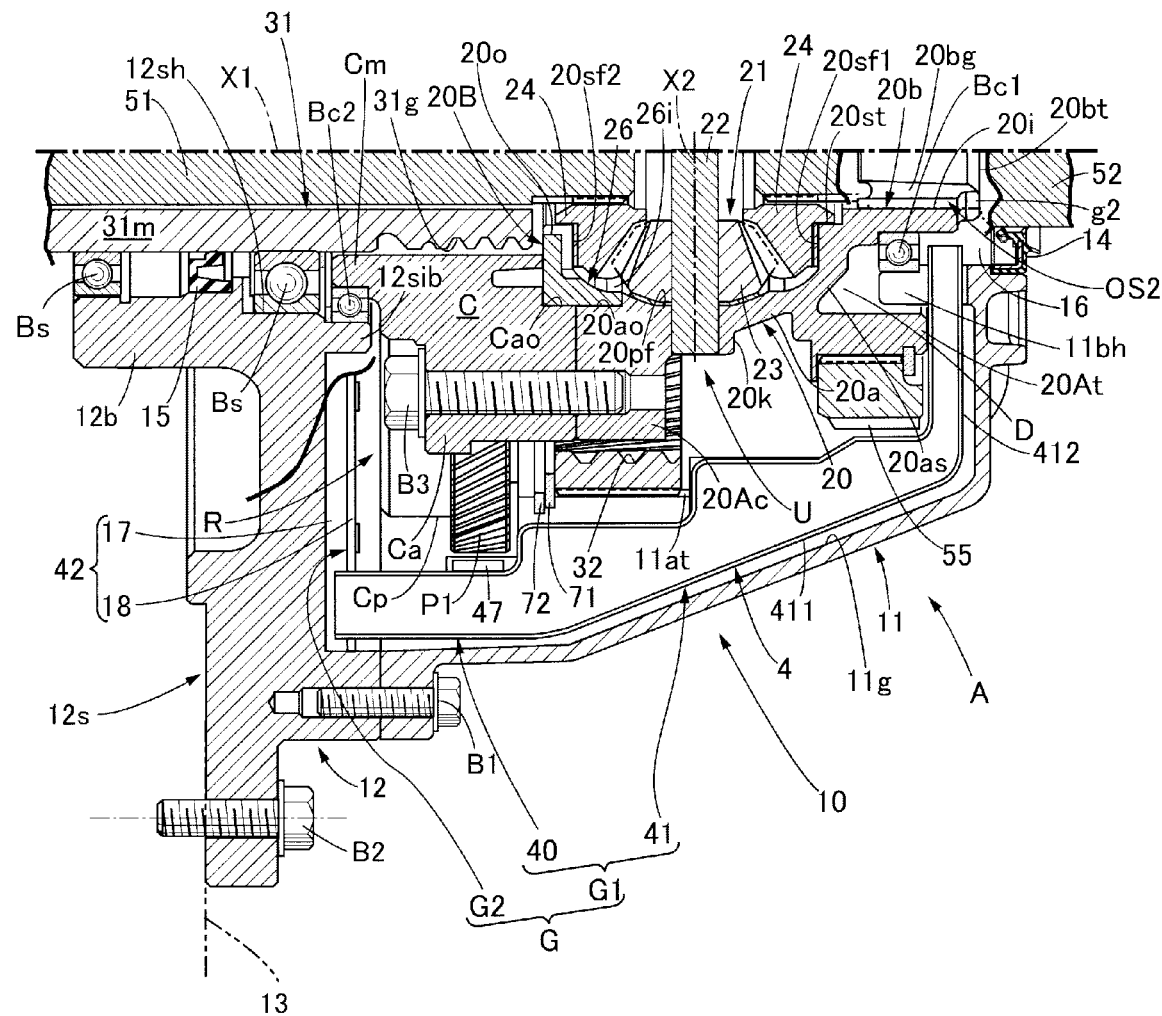
FIG. 2 is a sectional view along a line 2-2 in FIG. 1 (the first embodiment).

Next, reference is made mainly to FIGS. 1 and 2 to describe a specific example of the differential device D. The differential device D comprises the differential case 20 for receiving a rotational force from the gear reducer R and a differential gear mechanism 21 housed in a mechanism chamber inside the differential case 20.

The differential case 20 comprises a first case 20A and a second case 20B. The first case 20A is formed into a substantially bowl-shaped body having one open end. The second case 20B is formed into a circular ring shape so as to openably close the open end of the first case 20A. The first case 20A integrally includes a body part 20*a*, which is a main part of the differential case 20, and a bearing boss part 20*b* having a cylindrical shape and extending outwardly in the axial direction from a side wall 20*as* of the body part 20*a*. The bearing boss part 20*b* is one example of the second boss. The first unit support bearing Bc1 is interposed between an outer circumferential surface of the bearing boss part 20*b* and an inner circumferential surface of the boss part 11*b*, which is the first boss of the case body 11.

There is an oil introducing space 16 defined by the oil seal 14 sealing a gap between an outer circumference of the second output shaft 52 and the through hole 11*sh* of the first end wall part 11*s*, the inner circumferential surface of the boss part 11*b*, and an outer surface of the first unit support bearing Bc1. The oil introducing space 16 has an annular shape so as to surround the second output shaft 52. The oil introducing space 16 faces an oil introducing port 20*i* formed by an outer end opening of the bearing boss part 20*b*. The oil introducing port 20*i* can efficiently introduce, into the body part 20*a* of the differential case 20, an oil flowing inside the transmission case 10 (particularly, an oil to be captured and guided by a first oil guide G1, which will be described later).

The boss part 11*b* includes a through hole 11*bh* (see, FIG. 2) formed like a notch, and crossing the boss part 11*b* so as to make an inside and an outside of the boss part 11*b* communicate with each other (and thus make the oil introducing space 16 and another space inside the transmission case 10 communicate with each other). An open position at a downstream end part (a second gutter portion 412 of a first oil guiding part 41 to be described later) of the first oil guide G1 is set so as to deliver the oil guided by the first oil guide G1 into the oil introducing space 16 through the through hole 11*bh*. For example, the embodiment shows an example in which the downstream end part of the first oil guide G1 passes through the through hole 11*bh* and an open end at the downstream end part of the first oil guide G1 is located inside the oil introducing space 16. In this case, the oil directly flows from the first oil guide G1 into the oil introducing space 16.

Alternatively, it is possible to implement a variation in which the open end at the downstream end part of the first oil guide G1 is located in the middle of the through hole 11*bh*. Even in this case, the oil exiting the first oil guide G1 flows through the through hole 11*bh* into the oil introducing space 16. Alternatively, there may be a case where the oil discharged from the open end at the downstream end part of the first oil guide G1 can still flow into the through hole 11*bh* despite the open end being situated at a position outside the through hole 11*bh* (for example, a case where the open end is situated above the through hole 11*bh*, at a position on a downstream side in a flow direction of the oil discharged from the open end). In this case, the oil discharged from the open end flows into the oil introducing space 16 through the through hole 11*bh*.

The body part 20*a* of the first case 20A does not include an opening or an access window in a circumferential wall thereof. Thus, the body part 20*a* can store the lubricant oil therein.

The body part 20*a* includes an outer circumferential part whose inner surface is formed like a spherical surface, and a part of the inner surface forms a pinion gear support surface 20*pf*. On the other hand, an inner surface of the side wall 20*as* includes a first side gear support surface 20*sf*1 formed in an annular plane orthogonal to the first axis X1 and an annular recess part 20*st* continuous to an inner circumferential end of the first side gear support surface 20*sf*1.

In the annular recess part 20*st*, there is fitted a boss part on a back surface-side of a side gear 24 to be described later. As is apparent from FIG. 9, the inner surface of the body part 20*a* is provided with two or more side gear lubricant oil grooves 19 in recessed state extending so as to cross the first side gear support surface 20*sf*1 and the annular recess part 20*st*.

Figure 5:
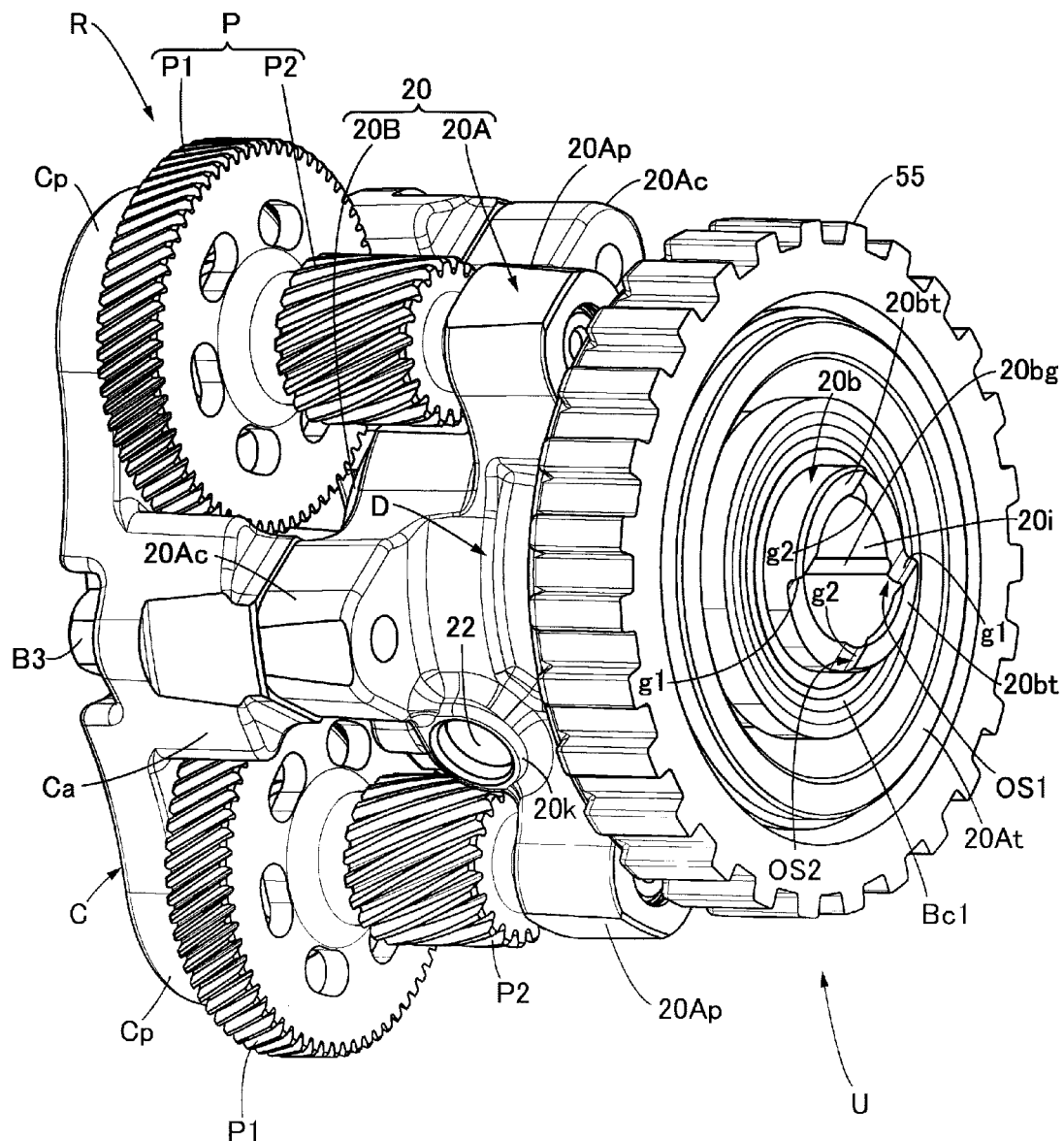
FIG. 5 is a perspective view of a main part of a transmission unit (the first embodiment).

As is apparent from FIG. 5, the bearing boss part 20*b* is provided with, at an outer end face thereof, paired guide protrusions 20*bt* in a protruding state having a circular arc shape and aligned at intervals in a circumferential direction. In an inner circumferential surface of the bearing boss part 20*b*, two sets of paired guide grooves 20*bg* are provided in a recessed state. In each pair, the guide grooves 20*bg* extend in the axial direction and correspond to one end and the other end of a corresponding one guide protrusion 20*bt* in the circumferential direction. Inner ends of these guide grooves 20*bg* communicate with inner circumferential ends of the side gear lubricant oil grooves 19. Thus, some of the oil to be supplied into the body part 20*a* through the guide grooves 20*bg* can be efficiently supplied to the side gear lubricant oil grooves 19 (and thus a rotatably sliding part of the side gear 24).

Each guide protrusion 20*bt* includes respective first and second guide faces g1 and g2 at the one end and the other end of the guide protrusion 20*bt* in the circumferential direction. The first guide face g1 introduces, to a corresponding guide groove 20*bg*, the oil existing in the oil introducing space 16 in the vicinity of an outer end of the bearing boss part 20*b* during the bearing boss part 20*b* and the second output shaft 52 making relative rotation to each other, particularly, during the second output shaft 52 rotating at a lower speed relative to the bearing boss part 20*b*. The second guide face g2 introduces, to a corresponding guide groove 20*bg*, the oil in the oil introducing space 16 particularly during the second output shaft 52 rotating at a higher speed relative to the bearing boss part 20*b*.

The first guide face g1 functions jointly with its corresponding guide groove 20*bg* to thereby configure a first oil supplying mechanism OS1 that supplies the oil inside the oil introducing space 16 into the body part 20*a* through the oil introducing port 20*i* in response to the above-described relative rotation. Furthermore, the second guide face g2 functions jointly with its corresponding guide groove 20*bg* to thereby configure a second oil supplying mechanism OS2 that supplies the oil inside the oil introducing space 16 into the body part 20*a* through the oil introducing port 20*i* in response to the above-described relative rotation.

As is apparent from FIG. 1, the guide groove 20*bg* as a whole extends along the axial direction and is formed at an angle such that a groove width gradually increases toward an inner side of the differential case 20 in the axial direction. In this case, the oil flowing in the guide groove 20*bg* is caught on a groove wall surface due to a centrifugal force to be generated by a rotation of the carrier C (thus the differential case 20). The oil caught on the groove wall surface due to an effect of the centrifugal force flows in a direction toward which the groove width increases (thus, toward an inner side of the body part 20*a*). As a result, a flow-in amount of the oil into the body part 20*a* increases as compared to a groove having a fixed groove width (that is, without a tapered shape).

It should be noted that although the guide groove 20*bg* described above is formed into a linear groove in the embodiment, the guide groove 20*bg* may be a groove tilting with respect to a direction along a generatrix of the bearing boss part 20*b*, or a helical groove. Particularly, in the case of the helical groove, the guide groove 20*bg* in the form of the helical groove exhibits a screw pump function as a result of the relative rotation described above. This can further enhance an effect to supply the oil into the body part 20*a*.

The second case 20B includes a through hole in a center part thereof, and the through hole configures an oil discharging port 20*o* for discharging the oil inside the body part 20*a* into the transmission case 10. The second case 20B configures the other side wall of the differential case 20 whose inner surface is formed in an annular plane orthogonal to the first axis X1 and configures a second side gear support surface 20*sf*2. In the oil discharging port 20*o*, there is fitted the boss part on the back surface-side of the side gear 24 whose back surface is supported by the second side gear support surface 20*sf*2.

The oil discharging port 20*o* is arranged so as to overlap with at least a part of the oil storing part O at the bottom part of the transmission case 10 in respect of a position in the axial direction. This can shorten a path for a return to the oil storing part O for the oil to be discharged from an inside of the differential case 20 through the oil discharging port 20*o*, allowing the oil to immediately return to the oil storing part O from the inside of the differential case 20. Thus, this is advantageous in setting the oil storing surface f of the oil storing part O low.

Moreover, the oil discharging port 20*o* is arranged so as to overlap with, in respect of a position in the axial direction, at least a part (intermediate part) of a planetary gear P of the gear reducer R to be described later. Consequently, some of the oil to be discharged from the inside of the differential case 20 through the oil discharging port 20*o* can be efficiently used for lubrication of the planetary gear P when splashed radially outward due to the effect of the centrifugal force resulting from the rotation of the carrier C of the gear reducer R.

In the differential case 20 of the embodiment, the oil introducing port 20*i* and the oil discharging port 20*o* are planes of a cylinder whose center axis is the rotation axis (that is, the first axis X1) of the differential case 20, and the oil discharging port 20*o* has a larger diameter than a diameter of the oil introducing port 20*i*. Accordingly, a radial distance from the first axis X1 to an inner circumferential surface (a bottom of a groove, if any) of the oil discharging port 20*o* is longer than a radial distance to an inner circumferential surface (the bottom of the groove, if any) of the oil introducing port 20*i*.

In light of the above, when the oil is stored inside the body part 20*a* and an oil level increases, the oil level first reaches the lowest part of the inner circumferential surface of the oil discharging port 20o prior to the inner circumferential surface of the oil introducing port 20i. Thus, the oil starts being discharged through the oil discharging port 20o rather than the oil introducing port 20i. This enables an oil flow in which the oil flowing into the body part 20a through the oil introducing port 20i is discharged from the oil discharging port 20o through the body part 20a.

Next, a description is given to one example of the differential gear mechanism 21. The differential gear mechanism 21 comprises a pinion shaft 22, paired pinion gears 23, and paired side gears 24. The pinion shaft 22 has both ends fitted and fixed to the first case 20A (particularly, the body part 20a) of the differential case 20 and is arranged on a second axis X2 orthogonal to the first axis X1. The pinion gears 23 are rotatably supported by the pinion shaft 22. The side gears 24 mesh with the respective pinion gears 23 and are rotatable about the first axis X1. The body part 20a is provided with supporting holes where the both ends of the pinion shaft 22 are fitted and supported, and a wall part of the body part 20a peripheral to the supporting holes configures a pinion shaft supporting part 20k.

The pinion shaft 22 is fixed to the body part 20a at one end thereof with a retaining pin 28 (see, FIG. 9) that crosses the one end of the pinion shaft 22, and is pressed and fixed to the body part 20a. It should be noted that a means to fix the pinion shaft 22 is not limited to the embodiment, and other fixing means (for example, clamping, a bolt, a retaining ring, and the like) may be implemented.

Although the pinion gears 23 and the side gears 24 are made of bevel gears, the types of gears are not limited to the bevel gears. The paired side gears 24 function as output gears of the differential gear mechanism 21. Inner circumferences of both the side gears 24 are in spline engagement with inner ends of the respective first and second output shafts 51 and 52. It should be noted that FIGS. 1 and 2 show a part of the second output shaft 52 with a long dashed double-short dashed line so as to explicitly show a guide groove structure in the inner circumferential surface of the bearing boss part 20b.

Each pinion gear 23 is supported by, on a spherical back surface thereof, the pinion gear support surface 20pf of the body part 20a via a washer in a rotatably slidable manner about the second axis X2. The respective side gears 24 are supported by, on planar back surfaces thereof, the first and second side gear support surfaces 20sf1 and 20sf2 via washers in a rotatably slidable manner about the first axis X1. It should be noted that the washers may be omitted as needed.

A rotational driving force transmitted from the carrier C of the gear reducer R to the first case 20A (and thus, the differential case 20) is distributed to the first and second output shafts 51 and 52 via the differential gear mechanism 21 while the first and second output shafts 51 and 52 are allowed to rotate at different speeds. A differential function of the differential gear mechanism 21 has been conventionally known and thus, a description thereof is omitted.

The second case 20B is provided with, in an inner surface thereof, oil grooves 26 that extend radially outward from the oil discharging port 20o and are open to an inner side of the body part 20a of the differential case 20 at an outside with respect to an outer circumferential part of the corresponding side gear 24. As is apparent from FIGS. 2, 6, and 7, the oil grooves 26 include two sets of paired grooves at respective positions corresponding to the pinion gears 23.

That is, each oil groove 26 is arranged at a position where a first open end 26i, as an oil inlet thereof, can directly take in the oil splashing from the pinion gears 23 due to rotation of the pinion gears 23. More specifically, the first open end 26i of the oil groove 26 into the body part 20a is arranged, as viewed in a projection plane (see, FIG. 6) orthogonal to the rotation axis, i.e., the first axis X1 of the transmission unit U, at a position that is inward of an outermost diametrical position of each pinion gear 23 (that is, a position overlapping with the pinion gear 23) and that does not overlap with the pinion shaft 22.

Furthermore, the first open end 26i of each oil groove 26 faces an internal space of the differential case 20 (the body part 20a) at a position corresponding to the outer circumferential part of the side gear 24, whereas a second open end 26o of each oil groove 26, which is an exit of the oil, faces the oil discharging port 20o. As is apparent from FIG. 6, an entire area of the oil groove 26 or a specific area of the oil groove 26 continuous from the first open end 26i extends so as to incline radially inward from the first open end 26i toward the second open end 26o (that is, so as to incline gradually away from the back surface of the corresponding side gear 24).

Due to this inclination of the oil groove 26, when the oil splashing from the rotating pinion gears 23 intensely flows into the oil groove 26 through the first open end 26i, the oil groove 26 can advantageously utilize intensity of the oil splashing from the pinion gears 23 to thereby efficiently guide the oil toward the second open end 26o for generating a flow toward the second open end 26o inside the oil groove 26 against the centrifugal force resulting from the rotation of the differential case 20. In this case, there is a conceivable possibility that the oil flowing through the oil groove 26 contacts the back surface of the rotating side gears 24, causing a problem of weakening the intensity of the oil flow toward the second open end 26o in some degree. However, since the above-described inclination can keep the oil groove 26 away from the back surface of the side gears 24 as much as possible, the oil flowing through the oil groove 26 is inhibited from contacting the side gears 24, which eliminates or minimizes an occurrence of the above-described problem.

Figure 6:
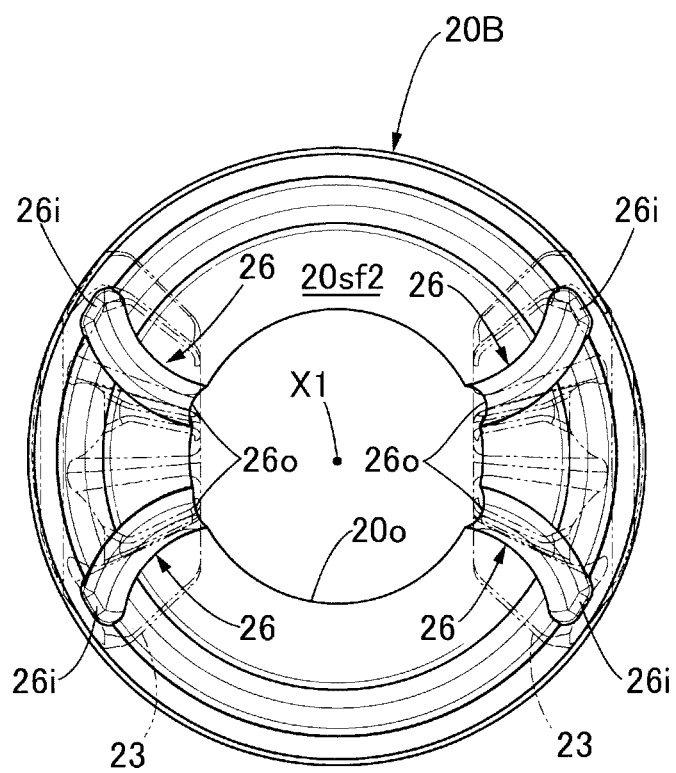
FIG. 6 is a side view of a second case of a differential case and pinion gears (in chain lines) as viewed from an inner side in an axial direction (the first embodiment).
Figure 7:
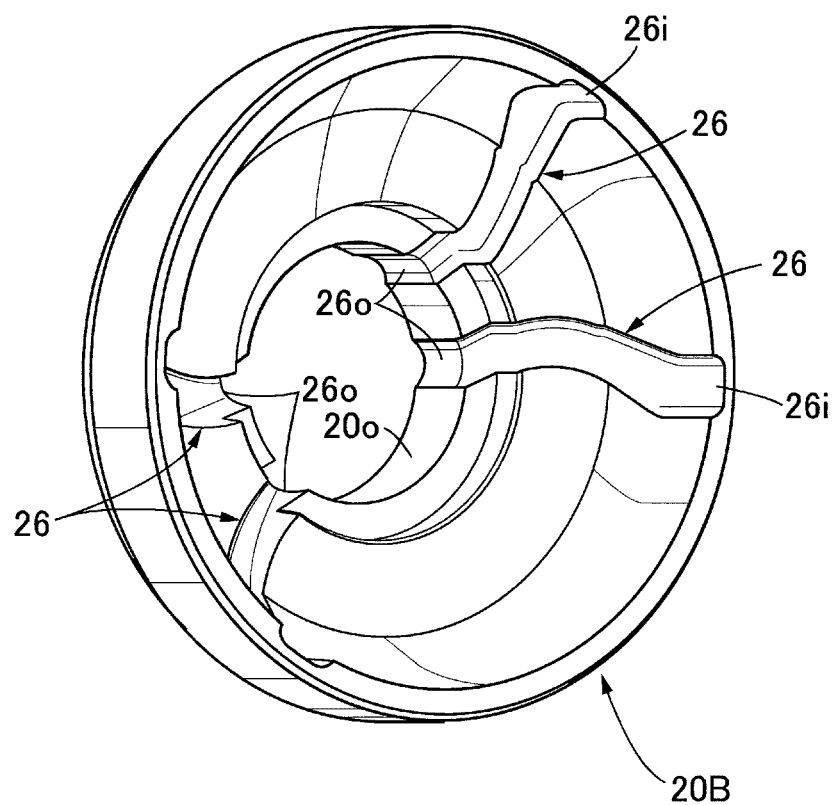
FIG. 7 is a perspective view of the second case alone as viewed from the inner side in the axial direction and obliquely from above (the first embodiment).
Figure 8:
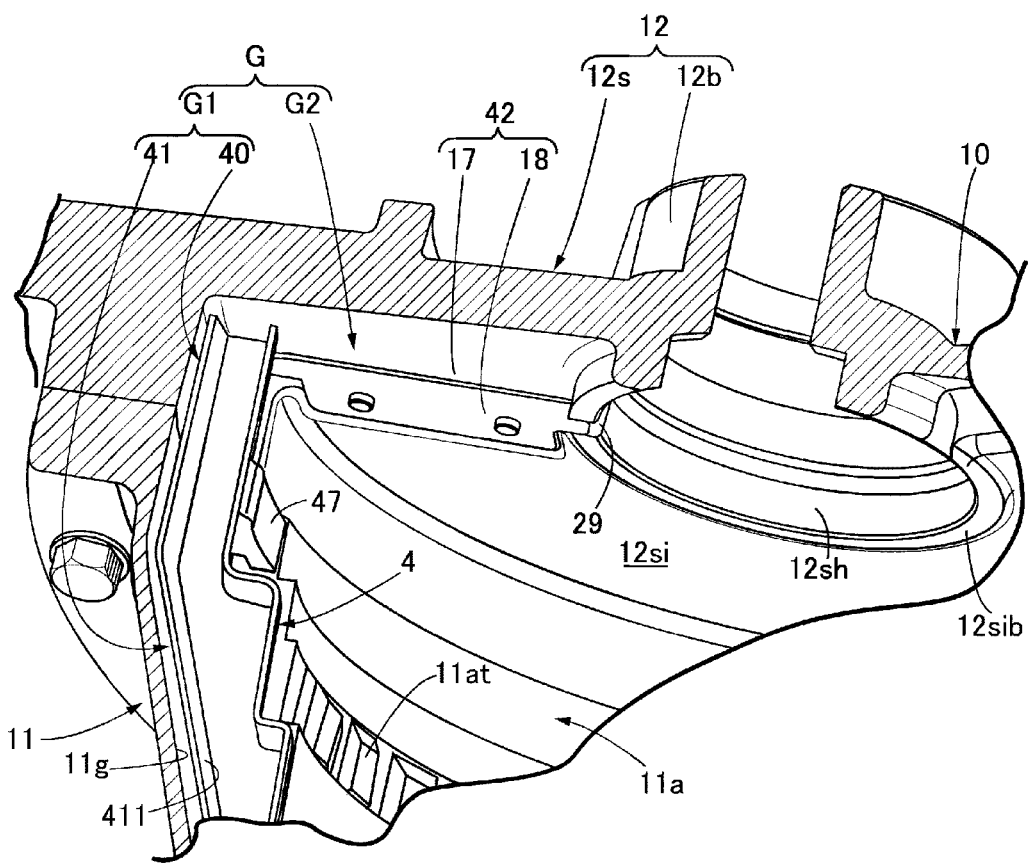
FIG. 8 is a perspective view showing an example of providing an inner surface of the transmission case with first and second oil guides (the first embodiment).

Furthermore, as is apparent from FIG. 6, the paired oil grooves 26 corresponding to each pinion gear 23 are formed in a shape of grooves, as viewed in a projection plane orthogonal to the first axis X1, that incline so as to curve obliquely toward respective one end and the other end in the circumferential direction with respect to an imaginary straight line extending radially outward from the oil discharging port 20o (the second open end 26o) between the oil grooves 26. Due to this inclination, in both cases where the differential case 20 rotates in a normal direction and a reverse direction, one oil groove 26 can guide the oil accumulated inside the differential case 20 toward the oil discharging port 20o by way of scooping up the same, and can thus efficiently discharge the oil into the transmission case 10.

Next, reference is also made to FIGS. 3 through 6 to describe one example of the gear reducer R. The gear reducer R includes a sun gear 31, which is an input of the gear reducer R; a ring gear 32 arranged concentrically to the sun gear 31 at a position offset in the axial direction from the sun gear 31; two or more (three in the illustrated drawing) planetary gears P meshing with the sun gear 31 and the ring gear 32; and the carrier C rotatably supporting the two or more planetary gears P via pivot shafts 33.

Each planetary gear P is a two-stage planetary gear that integrally includes a large-diameter gear part P1 that meshes with the sun gear 31 and a small-diameter gear part P2 that is formed to be smaller in diameter than the large-diameter gear part P1, situated on the one side in the axial direction (that is, on the side closer to the first unit support bearing Bc1), and meshes with the ring gear 32. The planetary gears P are formed coaxially and integrally with the pivot shafts 33 in the present embodiment.

It should be noted that although the large-diameter gear part P1, the small-diameter gear part P2, the sun gear 31, and the ring gear 32 in the present embodiment include gear teeth (for example, helical teeth) that receive a thrust due to a mesh reaction force, gear teeth other than the helical teeth may be used.

The sun gear 31 comprises a sun gear main body 31m having a cylindrical shaft shape and a gear part 31g formed on an outer circumference of a tip portion of the sun gear main body 31m. The sun gear main body 31m includes an intermediate portion whose outer circumference is rotatably supported by the transmission case 10 (the boss part 12b of the lid 12) via two or more bearings Bs. There is an oil seal 15 interposed between an outer circumferential surface of the sun gear 31 and an inner circumferential surface of the boss part 12b at an intermediate point of adjacent bearings Bs of the two or more bearings Bs. Moreover, the first output shaft 51 runs loosely, longitudinally through the sun gear 31, and between a leading end face of the sun gear 31 and an outer surface of the second case 20B of the differential case 20 facing the leading end face, there is provided in the axial direction a gap that always communicates with the internal space of the transmission case 10.

The sun gear main body 31m has a not-shown outer end part interlocked with and coupled to an output of a not-shown power source (for example, an electric motor) via a not-shown interlocking mechanism. Thus, the outer end part of the sun gear main body 31m can receive a rotational power from the power source. It should be noted that a gap between an inner circumference of the sun gear main body 31m and an outer circumference of the first output shaft 51 is sealed with a not-shown sealing means arranged at an outer side of the transmission case 10.

The ring gear 32 has an outer circumferential surface fitted and fixed to an inner circumferential surface of an intermediate portion in the axial direction of the body part 11a of the case body 11 (for example, locked with a known retaining means including a retaining ring 71 and a circlip 72). The outer circumferential surface of the ring gear 32 is integrally provided with two or more rotation-preventing protrusions 32t at intervals in the circumferential direction. The rotation-preventing protrusions 32t are unrotatably engaged with respect to two or more rotation-preventing grooves 11at formed in a partial area in the circumferential direction of the inner circumferential surface of the body part 11a in correspondence with the ring gear 32.

The carrier C comprises a cylindrical carrier base part Cm having an outer circumference fitted to and supported by the second end wall part 12s of the transmission case 10 in a freely rotatable manner via the second unit support bearing Bc2, and surrounding the gear part 31g of the sun gear 31; three large-diameter gear supporting parts Cp integrally connected to the carrier base part Cm and supporting one ends (particularly, outer end parts closer to the large-diameter gear parts P1) of the pivot shafts 33 of the three planetary gears P via a first planetary gear bearing Bp1 so as to make the pivot shafts 33 freely rotate; and three carrier arm parts Ca situated between the large-diameter gear supporting parts Cp adjacent to one another in the circumferential direction. The carrier base part Cm, the large-diameter gear supporting parts Cp, and the carrier arm parts Ca are integrally joined to one another, to thereby form a carrier joining body.

Furthermore, the three carrier arm parts Ca and their corresponding three coupling arm parts 20Ac, which are integrally provided in a protruding manner to an outer circumferential part of the first case 20A of the differential case 20, are detachably coupled via bolts B3 threadedly inserted from the carrier arm parts Ca. Accordingly, the carrier C and the first case 20A are coupled integrally.

Still further, the outer circumferential part of the first case 20A is integrally provided with three supporting arm parts 20Ap in a protruding state. The three supporting arm parts 20Ap face the three large-diameter gear supporting parts Cp of the carrier C while being spaced apart from the same in the axial direction, and are arranged adjacent to the small-diameter gear parts P2 of the planetary gears P in the axial direction. In these supporting arm parts 20Ap, the pivot shafts 33 integrally extending from the small-diameter gear parts P are fitted and supported in a freely rotatable manner via a second planetary gear bearing Bp2.

As described above, the pivot shafts 33 of the planetary gears P are supported by the carrier C via the first planetary gear bearing Bp1 at one end parts thereof closer to the large-diameter gear parts P1, and are supported by the supporting arm parts 20Ap of the first case 20A via the second planetary gear bearing Bp2 at the other end parts thereof closer to the small-diameter gear parts P2. The first bearing Bp1 has a bearing structure (for example, a ball bearing) that can receive both a radial load and a thrust load in the axial direction, and the second bearing Bp2 is a needle bearing.

The side wall 20as, on the one side in the axial direction, of the differential case 20 (the first case 20A) integrally includes a cylindrical part 20At that concentrically surrounds a bearing boss 20b as the second boss. On an outer circumferential part of the cylindrical part 20At, an inner circumferential part of a parking gear 55 is fitted and fixed as a component arranged adjacent in the axial direction to the second planetary gear bearing Bp2 as a planetary gear supporting part. In the embodiment, a fixing means include both a spline engagement and a locking means such as a circlip. It should be noted that the component is not limited to the parking gear 55, and may be replaced with another functional component that is engaged with and fixed to an outer circumference of the cylindrical part 20At and exhibits a certain function inside the transmission case 10.

Between engaging surfaces of the inner circumferential part of the parking gear 55 and the outer circumferential part of the cylindrical part 20At, there is a hollow part 56 leading to the second planetary gear bearing Bp2 and formed annularly, or partially in the circumferential direction. The cylindrical part 20At is provided with a communication hole 57 allowing a communication between the hollow part 56 and an inner circumferential surface of the cylindrical part 20At.

As described above, the planetary gears P are pivotally supported by the carrier C at the side thereof closer to the large-diameter gear parts P1, and pivotally supported by the differential case 20 at the side thereof closer to the small-diameter gear parts P2. Furthermore, the second case 20B of the differential case 20 is held between the first case 20A and the carrier C coupled to the first case 20A, and by this holding, the second case 20B is fixed to the first case 20A. In this case, at least one (both in the present embodiment) of mutually-facing surfaces of the carrier C (the carrier arm parts Ca) and the body part 20a of the first case 20A includes recess parts Cao and 20*ao* depressed in the axial direction. The second case 20B is held between the carrier C and the first case 20A while being fitted to the recess parts Cao and 20*ao*.

Needless to say, the above-described mutually-facing surfaces not only include so-called joining surfaces where the mutually-facing surfaces directly contact with each other as in the embodiment. In addition, the mutually-facing surfaces may be facing surfaces that face each other with a gap therebetween, and the latter facing surfaces (that is, facing surfaces other than the joining surfaces) may be provided with recesses depressed in the axial direction similarly to the recesses Cao and 20*ao*, so that the second case 20B is fitted thereto.

Figure 9:
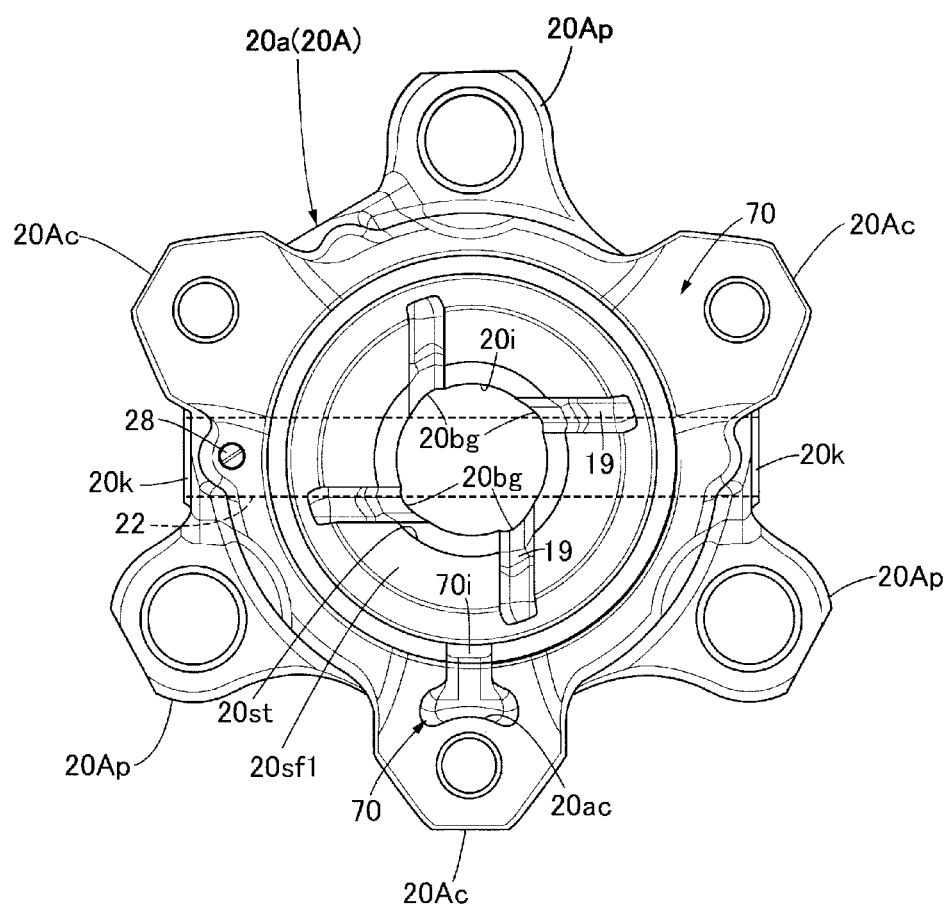
FIG. 9 is a side view of a first case of the differential case as viewed from the inner side in the axial direction (the first embodiment).

As is apparent from FIGS. 1 and 9, the differential case 20, and in particular to the first case 20A comprises at least a part of a contamination pouch 70 that can collect a contam from the oil inside the body part 20*a*. Here, the contam is an abbreviation for a contamination, and refers to a general term for metal powders to be produced and mixed with the oil from a movable part inside the transmission case 10 due to metal members mechanically contacting each other, and other fine foreign substances with a larger specific gravity than the oil.

The above-described contamination pouch 70 includes an inlet 70*i* facing into the body part 20*a*. Moreover, the inlet 70*i* is arranged in a largest inner diameter part 20*d* in the inner surface of the differential case 20 on which the largest centrifugal force acts, so that the centrifugal force makes the contamination pouch 70 easily take in the contamination in the oil inside the body part 20*a*.

As is apparent from FIGS. 1 and 9, the contamination pouch 70 in the embodiment is arranged at only one place shifted by 90 degrees in a phase with respect to an axis of the pinion shaft 22. Consequently, the contamination pouch 70 is arranged at a position spaced apart in the circumferential direction of the differential case 20 with respect to the pinion gear support surface 20*pf* whose center part penetrated by the pinion shaft 22.

It should be noted that at least a part of the inlet 70*i* of the contamination pouch 70 may be arranged closer to the oil discharging port 20*o* with respect to the above-described largest inner diameter part 20*d* in the inner surface of the differential case 20.

The inlet 70*i* of the contamination pouch 70 is provided with, in a peripheral part thereof, a protruding part 70*k* that closes a part of the inlet 70*i*. The protruding part 70*k* in the embodiment is formed by an outer circumferential wall part of the second case 20B facing the inlet 70*i*. It should be noted that the protruding part 70*k* may be formed in the first case 20A or the carrier C.

Each contamination pouch 70 is formed so as to bridge over the carrier arm parts Ca and the first case 20A. In other words, the contamination pouch 70 is defined by a pouch part Cac on a carrier C-side, provided in a recessed state in a joining surface of the carrier arm parts Ca with respect to the body part 20*a*, and a pouch part 20*ac* on a body part 20*a*-side, provided in a recessed state in a joining surface of the body part 20*a* with respect to the carrier arm parts Ca. The pouch part Cac on the carrier C-side may be omitted, and the contamination pouch 70 may be formed by the pouch part 20*ac* on the body part 20*a*-side and a planar end face of the carrier arm parts Ca that closes the pouch part 20*ac*.

By revolving in a normal direction of the carrier C, the planetary gears P of the gear reducer R, particularly, the large-diameter gear supporting parts P1 can lift up the oil in the oil storing part O at the bottom part of the transmission case 10. There is provided, inside the transmission case 10, an oil guide G for capturing the oil lifted up and efficiently supplying the same for lubrication of lubrication target parts (for example, the first and second unit support bearings Bc1 and Bc2) inside the transmission case 10.

In this case, the normal direction of the carrier C is a rotation direction of the carrier C when the first and second output shafts 51 and 52, and thus left and right wheels rotate in a direction to move the vehicle forward via the transmission unit U with a driving force of the electric motor, which is the power source. For example, the normal direction is a clockwise direction in FIG. 3. Furthermore, the planetary gears P are arranged such that bottom parts of the large-diameter gear parts P1 of the planetary gears P in a revolution trajectory are dipped below the oil storing surface f of the oil storing part O. This arrangement enables an oil lifting operation by the large-diameter gear parts P1.

The oil guide G is configured by the first and second oil guides G1 and G2. Particularly, the first oil guide G1 comprises an oil capturing part 40 that can capture the oil lifted up by the revolution of the large-diameter gear parts P1; and a first oil guiding part 41 axially extending toward the one side in the axial direction from the oil capturing part 40 for guiding some of the oil captured by the oil capturing part 40 to the oil introducing port 20*i* or a periphery of the oil introducing port 20*i*. The oil capturing part 40 is arranged at a position outward of the revolution trajectory of the large-diameter gear parts P1 in the radial direction of the transmission case 10.

The first oil guide G1 in the embodiment is configured by a gutter-like member 4, with an open top face (that is, in a U-shape in a traverse cross-section), provided along and fixed to an inner surface of the case body 11 of the transmission case 10. The gutter-like member 4 is arranged so as to longitudinally run inside an attachment groove 11*g* provided continuously in the inner surface of the case body 11 (more specifically, the body part 11*a* and the first end wall part 11*s*) in a recessed state. The gutter-like member 4 is fixed to the case body 11 by fixing (for example, screwing, clamping, welding, etc.) a bottom part thereof to the body part 11*a* via two or more attachment pieces 47.

It should be noted that the attachment pieces 47 may be fixed to a part of the gutter-like member 4 different from the bottom part (for example, a side wall part or the like), or may be formed integrally with the gutter-like member 4.

An upstream-side part of the gutter-like member 4, which functions as the oil capturing part 40, extends horizontally and linearly along the first axis X1. A downstream-side part of the gutter-like member 4, which is relatively longer and functions as the first oil guiding part 41, includes a first gutter portion 411 along an inner circumferential surface of the body part 11*a* of the case body 11; and a second gutter portion 412 bending from the first gutter portion 411 and extending along an inner surface of the first end wall part 11*s*.

There is provided a gentle and continuous slope downward from an upstream end (that is, a downstream end of the oil capturing part 40) of the first gutter portion 411 toward a downstream end of the second gutter portion 412. Thus, the oil captured by the oil capturing part 40 can gently flow down the oil capturing part 40 and the first oil guiding part 41, and be supplied to the first unit support bearing Bc1 facing a downstream end of the first oil guiding part 41. It should be noted that some part of the first oil guiding part 41 (the first gutter portion 411) is, as is apparent in FIG. 2, arranged so as to run between the ring gear 32 and the body part 11a in the radial direction.

The second oil guide G2 includes, as a main part, a second guiding part 42 for receiving some of the oil captured by the oil capturing part 40 from an end of the oil capturing part 40 on the other side in the axial direction and guiding the same to the second unit support bearing Bc2, and the second guiding part 42 is provided along an inner surface 12si of the second end wall part 12s of the transmission case 10 that faces the gear reducer R. Specifically, the inner surface 12si is formed substantially along an imaginary plane orthogonal to the first axis X1 and passing through the oil storing part O. The inner surface 12si is provided with a step part 17, with an open top face, linearly extending in a form of a downward slope from a position immediately below the oil capturing part 40 toward the second unit support bearing Bc2. Furthermore, in an annular boss part 12sib provided to the inner surface 12si around the through hole 12sh in a protruding state toward the inner side in the axial direction, there is formed, at a position corresponding to an inner end in a longitudinal direction of the step part 17, a communication oil groove 29 in a form of a cutout that allows a communication between an inside and an outside in the radial direction of the annular boss part 12sib.

Moreover, there is formed a second oil guiding part 42 in a form of a gutter with an open top face by an inner surface of the step part 17 and a strip-like plate 18 linearly extending along the step part 17 and screwed to the second end wall part 12s at a lower side with respect to the step part 17. Accordingly, the oil received by the second oil guiding part 42 from the end of the oil capturing part 40 on the other side in the axial direction flows down the second oil guiding part 42 and is then supplied to the second unit support bearing Bc2 and a peripheral part of the second unit support bearing Bc2 through the communication oil groove 29. It should be noted that the second oil guiding part 42 may be formed by an integrated gutter-like member such as the gutter-like member 4 forming the first oil guide G1.

In conjunction with the rotation of the carrier C, the planetary gears P (the large-diameter gear parts P1) rotate, while revolving as described above, in an opposite direction (in a counterclockwise direction in FIG. 3) to a revolution direction. Consequently, the oil splashes in the opposite direction to the revolution direction (that is, a direction in which the oil is lifted up), which is likely to decrease an effect of lifting up the oil. To address this, as is apparent in FIG. 3, the oil capturing part 40 of the first oil guide G1 in the present embodiment is arranged in a semicircle part (that is, a left semicircle part in FIG. 3) of an outer circumferential wall of the transmission case 10 that starts at a deepest part of the oil storing part O and is positioned on a front side in the normal direction of the carrier C.

Consequently, even when the planetary gears P rotate in the opposite direction to the revolution direction, the oil capturing part 40 in the form of the gutter with the open top face can efficiently capture the oil splashing in the opposite direction to the direction in which the oil is lifted due to the revolution. It should be noted that, in order to sufficiently obtain such an effect of capturing the oil, a circumferential position of the oil capturing part 40 may be set to any position in the semicircle part (that is, the left semicircle part in FIG. 3) of the outer circumferential wall of the transmission case 10, and not limited to the circumferential position in the embodiment as shown in FIG. 3.

Figure 3:
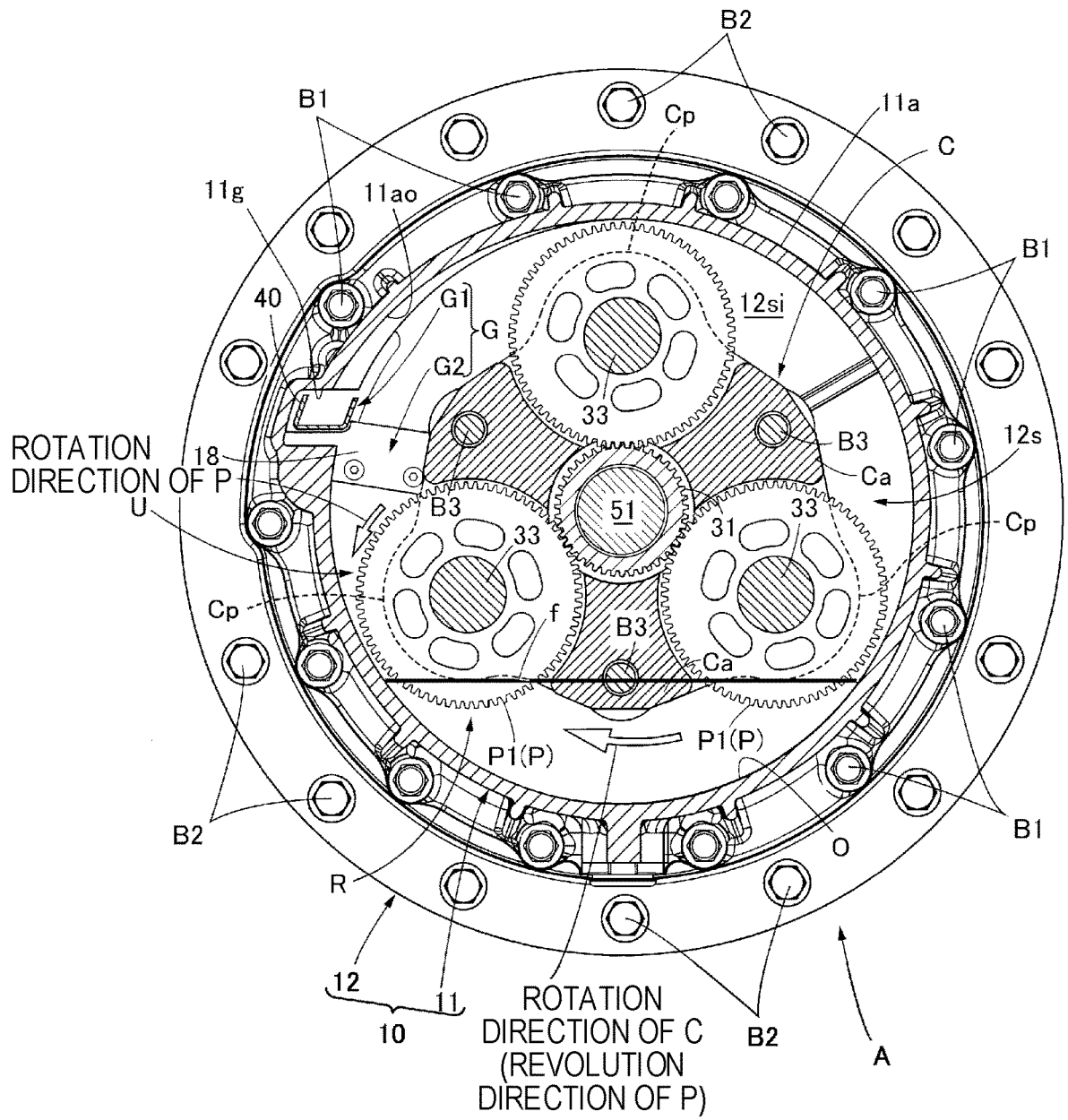
FIG. 3 is a sectional view along a line 3-3 in FIG. 1 (the first embodiment).
Figure 4:
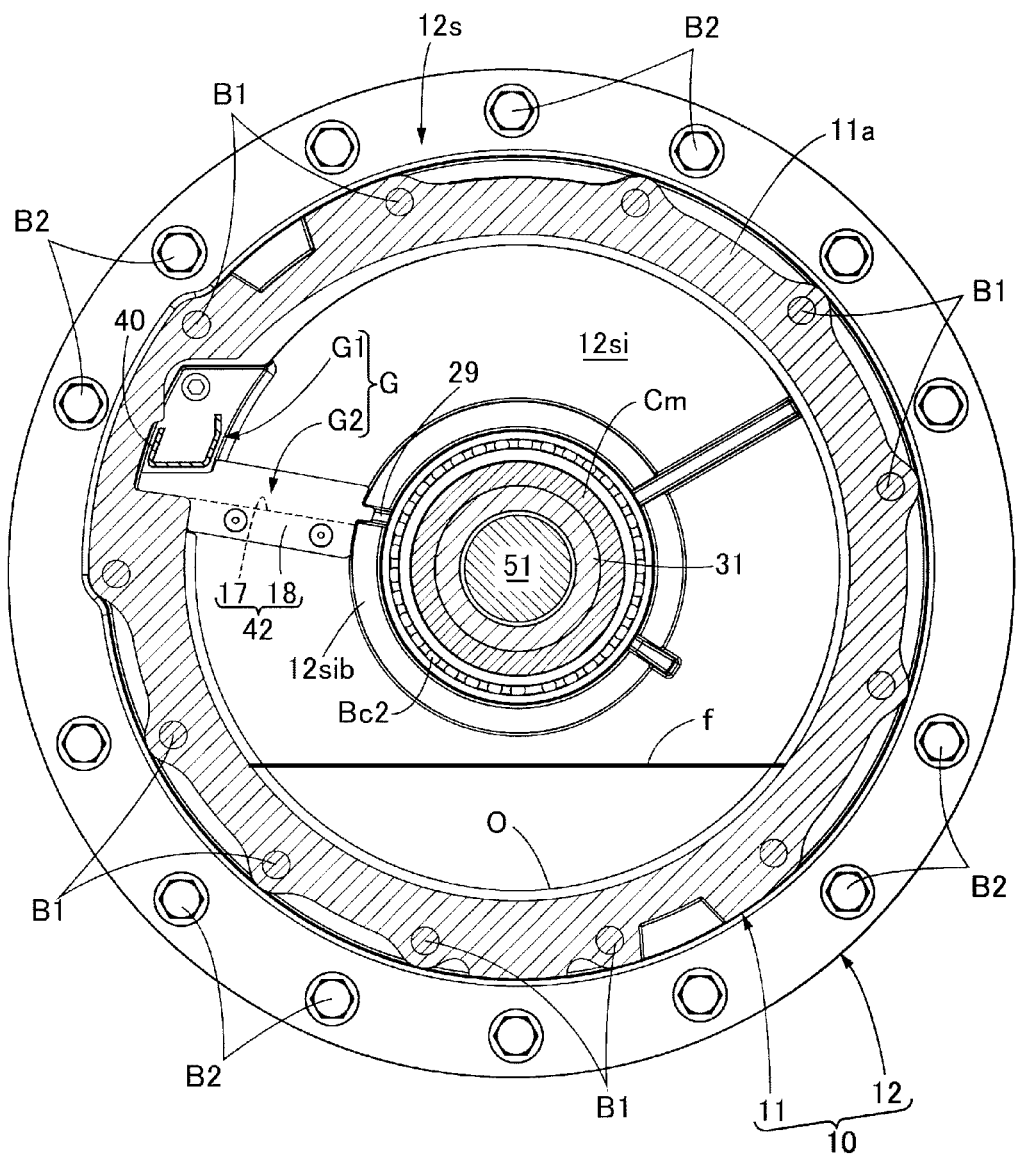
FIG. 4 is a sectional view along a line 4-4 in FIG. 1 (the first embodiment).

As is further apparent in FIG. 3, in an inner surface of an outer circumferential wall of the case body 11, there is formed a guiding recess part 11ao arranged in the vicinity of a front side of the oil capturing part 40 in the normal direction and depressed outward in the radial direction of the case body 11. The guiding recess part 11ao is formed in a form of a cutout groove extending in the circumferential direction and has a groove bottom gradually deepening toward the oil capturing part 40 in the circumferential direction. The guiding recess part 11ao is in the same position in the axial direction as at least a part of the oil capturing part 40 and can thus effectively capture and deliver some of the oil splashing, and efficiently guide the same to the oil capturing part 40 when the large-diameter gear parts P1 face and pass through the guiding recess part 11ao.

Next, a description is given to an operation of the embodiment.

In the transmission device A, as the sun gear 31 is rotationally driven by the not-shown power source (for example, an electric motor), the sun gear 31 and the ring gear 32, and the large-diameter gear parts P1 and the small-diameter gear parts P2 of the two-stage planetary gears P mesh with one another, whereby a rotational driving force of the sun gear 31 is transmitted to the carrier C while being decelerated in two phases. The rotational driving force transmitted to the differential case 20 (particularly, the first case 20A) fixed to the carrier C is distributed to the first and second output shafts 51 and 52 by the differential gear mechanism 21 inside the differential case 20, with the first and second output shafts 51 and 52 being allowed to rotate at different speeds. The rotational driving force is transmitted to the left and right wheels via the first and second output shafts 51 and 52.

In the transmission device A, the transmission case 10 with the oil storing part O at the bottom part thereof houses the transmission unit U whose respective differential device D and gear reducer R of the planetary gear type are arranged on the one side and the other side in the axial direction. The differential case 20 of the differential device D includes the body part 20a that can store the oil; the oil introducing port 20i open to the one side in the axial direction; and the oil discharging port 20o open to the other side in the axial direction. The large-diameter gear parts P1 of the planetary gears P, which revolve in the same direction as the carrier C rotates, are arranged such that the bottom parts of the large-diameter gear parts P1 in the revolution trajectory is dipped below the oil storing surface f of the oil storing part O. The first oil guide G1, which captures the oil lifted up from the oil storing part O by the large-diameter gear parts P1 due to the revolution and guides the same to the oil introducing port 20i, is arranged in the transmission case 10 so as to extend toward the one side in the axial direction from the position radially outward of the revolution trajectory.

Consequently, the large-diameter gear parts P1, which revolve in conjunction with the rotation of the carrier C, can not only sufficiently lift up a stored oil in the oil storing part O, but also capture the oil lifted up in the oil capturing part 40 of the first oil guide G1 and guide the oil captured to the oil introducing port 20i through the first oil guiding part 41 and the oil introducing space 16. Thus, the oil can be sufficiently supplied into the body part 20a from the oil introducing port 20i. Then, the oil accumulated inside the body part 20a flows back to the oil storing part O inside the transmission case 10 through the oil discharging port 20o. Therefore, even when the level of the oil storing surface f of the oil storing part O is so low that only some portions of the large-diameter gear parts P1 are immersed in the oil in a stationary state of the transmission device A, the oil lifted up by the large-diameter gear parts P1 can be efficiently and sufficiently supplied into the differential case 20 through the first oil guide G1. As described above, by setting the oil storing surface f of the oil storing part O low, it is possible to suppress a churning resistance of the oil while achieving a lubrication performance for the differential gear mechanism 41 inside the differential case 20. Accordingly, transmission efficiency can be improved.

Moreover, since there is no need for an oil pump for supplying the oil into the differential case 20, cost reduction can be achieved.

The first unit support bearing Bc1, which supports the one side in the axial direction of the transmission unit U, is interposed between the inner circumferential surface of the boss part 11b as the first boss provided in a protruding manner to the inner surface of the first end wall part 11s of the transmission case 10 on the same side and the outer circumferential surface of the bearing boss part 20b as the second boss provided in a protruding manner to the side wall 20as of the differential case 20 on the same side. The oil seal 14 sealing the gap between the outer circumference of the second output shaft 52 and the through hole 11sh of the first end wall part 11s, the inner circumferential surface of the boss part 11b, and the outer surface of the first unit support bearing Bc1 define the oil introducing space 16 facing the oil introducing port 20i. The boss part 11b includes the through hole 11bh allowing a communication between the inside and the outside of the boss part 11b. Moreover, the downstream end (the second gutter portion 412 of the first oil guiding part 41) of the first oil guide G1 passing through the through hole 11bh is open to the oil introducing space 16. Between the bearing boss part 20b and the second output shaft 52, there are provided the first and second oil supply mechanisms OS1 and OS2 for supplying the oil inside the oil introducing space 16 into the body part 20a through the oil introducing port 20i in accordance with the relative rotation between the bearing boss part 20b and the second output shaft 52.

Consequently, the oil exiting the first oil guide G1 and guided to the oil introducing space 16 can be efficiently supplied into the differential case 20 in a rotating state through the oil introducing port 20i with the oil supply mechanisms OS1 and OS2 utilizing the above-described relative rotation. Moreover, the oil accumulated in the oil introducing space 16 can be used to efficiently lubricate the first unit support bearing Bc1.

Furthermore, the side wall 20as of the differential case 20 integrally includes the cylindrical part 20At surrounding the bearing boss 20b. The inner circumferential part of the parking gear 55, which is arranged adjacent to the second planetary gear bearing Bp2 in the axial direction, is fitted and fixed to the outer circumferential part of the cylindrical part 20At. Between fitting surfaces of the inner circumferential part of the parking gear 55 and the outer circumferential part of the cylindrical part 20At, there is formed the hollow part 56 communicating with the second planetary gear bearing Bp2, and the cylindrical part 20At is provided with the communication hole 57 making the hollow part 56 communicate with the inner circumferential surface of the cylindrical part 20At. Consequently, the oil reaching the first unit support bearing Bc1 through the first oil guide G1 and the oil introducing space 16 lubricates the first unit support bearing Bc1, and thereafter flows along the side wall 20as of the differential case 20 and reaches the inner circumferential surface of the cylindrical part 20At due to the centrifugal force. Then, the oil flows in the hollow part 56 through the communication hole 57, from which the oil can reach the second planetary gear bearing Bp2 and efficiently lubricate the same.

The second unit support bearing Bc2, which supports the other side in the axial direction of the transmission unit U, is attached to the second end wall part 12s of the transmission case 10 facing the gear reducer R. Moreover, the inner surface 12si of the second end wall part 12s is formed substantially along the imaginary plane orthogonal to the first axis X1 and passing through the oil storing part O. Along the inner surface 12si of the second end wall part 12s, there is provided the second oil guide G2 for receiving, from the oil capturing part 40, some of the oil captured by the oil capturing part 40 and guiding the same to the second unit support bearing Bc2.

Consequently, the second oil guide G2 can receive some of the oil captured by the oil capturing part 40 of the first oil guide G1 and guide the same to the second unit support bearing Bc2 provided to the end wall part 12s of the transmission case 10 and the periphery of the second unit support bearing Bc2, to thereby efficiently lubricate the second unit support bearing Bc2. Moreover, the inner surface 12si of the second end wall part 12s along which the second oil guide G2 is provided is arranged substantially along the imaginary plane orthogonal to the first axis X1 and passing through the oil storing part O. Thus, the oil that has lubricated the second unit support bearing Bc2 can quickly reach the oil storing part O through a shortest path by simply substantially vertically flowing down along the inner surface 12si. Accordingly, it is advantageous in setting the oil storing surface f of the oil storing part O low.

In the inner surface of the differential case 20 (more specifically, the inner surface of the second case 20B) facing the back surface of the side gear 24 on the other side in the axial direction, there is provided the oil groove 26 extending radially outward from the oil discharging port 20o and is open into the differential case 20 at an outside with respect to the outer circumferential part of the corresponding side gear 24. The first open end 26i of the oil groove 26 into the differential case 20 is arranged at a position where the first open end 26i can take in the oil splashing from the pinion gears 23 due to the rotation of the pinion gears 23.

Consequently, by utilizing a fluid energy of the oil splashing inside the differential case 20 from the pinion gears 23, the oil groove 26 can efficiently deliver the oil to the second open end 26o facing the oil discharging port 20o. Moreover, since the first open end 26i of the oil groove 26 can be limited to a specific area corresponding to an oil splashing area of the pinion gears 23, a length of the oil groove 26 can be shortened as much as possible. Therefore, the oil splashing by the pinion gears 23 is quickly recirculated to the oil discharging port 20o, from which the oil can return to the oil storing part O.

It should be noted that, as described above, the planetary gears P (particularly, the large-diameter gear parts P1) can revolve in the normal direction of the carrier C, to thereby lift up the oil in the oil storing part O, whereas the planetary gears P splash the oil in the opposite direction to the revolution direction (that is, the direction in which the oil is lifted) due to its rotation in the opposite direction in conjunction with the revolution.

In the present embodiment, the oil capturing part 40 of the first oil guide G1 is arranged in the semicircle part (the left semicircle part in FIG. 3) of the outer circumferential wall of the transmission case 10 that starts at the deepest part of the oil storing part O and positioned on the front side in the normal direction of the carrier C. Consequently, the oil capturing part 40 can effectively capture the oil splashing in the above-described opposite direction. That is, even when the planetary gears P rotate in the opposite direction to the revolution direction, the oil capturing part 40 positioned in the above-described semicircle part of the outer circumferential wall can sufficiently capture the oil splashing in the opposite direction to the revolution direction. This minimizes the capturing effect being affected by the above-described rotation.

In the transmission unit U, particularly in the embodiment, the differential case 20 is configured to be divided into the first and second cases 20A and 20B. In contrast, the planetary gears P are pivotally supported by the carrier C on the large-diameter gear parts P1 thereof, and pivotally supported by the first case 20A on the small-diameter gear parts P2 thereof. The first case 20A and the carrier C, which is coupled to the first case 20A, hold the second case 20B therebetween, whereby the second case 20B is fixed to the first case 20A. Consequently, the large carrier C, which pivotally supports the large-diameter gear parts P1 of the planetary gears P, is subsequently coupled to the first case 20A as a component separated from the differential case 20. Thus, as compared to a conventional structure with the large carrier C and the differential case 20 as an integrated component, not only a simplified structure of the differential case 20 is achieved, but also ease of assembly of the gear reducer R is improved, resulting in cost reduction.

Moreover, the second case 20B can be fixed by simply holding the same between the carrier C and the first case 20A. Therefore, there is no need for a dedicated fixing means for the second case 20B, that is, the second case 20B can be coupled to the first case 20A with a simple structure utilizing the carrier C.

The first case 20A is provided with the pinion shaft supporting part 20k for the pinion shaft 22 supporting the pinion gears 23 of the differential gear mechanism 21, and the small-diameter gear parts P2 of the planetary gears P are pivotally supported by the first case 20A. Thus, the rotational force from the planetary gears P and the pinion shaft 22 is not directly input to the second case 20B, which can reduce a resulting load to be imposed. Therefore, the strength of rigidity of the second case 20B can be set low, which can achieve a light weight and downsizing of the second case 20B.

Furthermore, at least one (both in the embodiment) of the mutually-facing surfaces of the carrier C and the first case 20A in the embodiment includes the recess parts Cao and 20ao depressed in the axial direction. The second case 20B is held between the carrier C and the first case 20A while being fitted to the recess parts Cao and 20ao. Consequently, by simply making the second case 20B fitted to the recess parts Cao and 20ao facing the above-described facing surface, positioning of the second case 20B in the radial direction can be easily and precisely performed, resulting in improvement in ease of assembly.

In the differential case 20 in the embodiment, since the open end of the first case 20A on the other side in the axial direction is closed by the second case 20B, the differential gear mechanism 21 can be assembled inside the first case 20A from the other side in the axial direction with the first and second cases 20A and 20B separated from each other. Furthermore, since the planetary gears P are held at both ends thereof by the first case 20A and the carrier C, the planetary gears P can be assembled to the first case 20A from the other side in the axial direction. Moreover, with respect to the first case 20A to which the planetary gears P and the second case 20B are assembled, the carrier C can be assembled from the other side in the axial direction in conformity with the planetary gears P. This allows the differential gear mechanism 21, the second case 20B, the planetary gears P, and the carrier C to be sequentially assembled to the first case 20A from the same direction (that is, the other side in the axial direction), which significantly improves ease of assembly as a whole.

When the contamination remaining in the oil accumulated inside the body part 20a of differential case 20 increases without being discharged to the outside of the differential case 20, the contamination diffuses inside the differential case 20 during transmission. This may decrease performance of the differential device D. However, the differential case 20 of the present embodiment comprises at least a part of the contamination pouch 70 including the inlet 70i facing into the body part 20a of the differential case 20 and capable of capturing the contamination in the oil inside the body part 20a. The inlet 70i is arranged in the largest inner diameter part 20d on which the largest centrifugal force acts in the inner surface of the differential case 20, or arranged closer to the oil discharging port 20o with respect to the largest inner diameter part 20d.

Consequently, in a configuration particularly where the inlet 70i is arranged in the largest inner diameter part 20d, the contamination in the oil inside the body part 20a can be effectively captured by the contamination pouch 70 with the centrifugal force during rotation of the differential case 20. This suppresses diffusion of the contamination inside the body part 20a. Furthermore, the contamination collected in the largest inner diameter part 20d with the centrifugal force easily flows out toward the oil discharging port 20o along with the oil flowing from the oil introducing port 20i toward the oil discharging port 20o. Thus, in a case where the inlet 70i is arranged closer to the oil discharging port 20o with respect to the largest inner diameter part 20d, the contamination pouch 70 can also effectively capture the contamination. In any case, it is possible to effectively suppress a decrease in the performance of the differential device D caused by the diffusion of the contamination.

Furthermore, the peripheral part of the inlet 70i of the above-described contamination pouch 70 is provided with the protruding part 70k closing a part of the inlet 70i. Thus, even when the inlet 70i is temporarily oriented downward in association with rotation of the differential case 20, the contamination to flow out the inlet 70i is caught on the protruding part 70k. Therefore, the contamination captured by the contamination pouch 70 can be effectively inhibited from exiting the contamination pouch 70.

Still further, when a magnet is placed inside the contamination pouch 70 so as to attract the contamination, the contamination captured by the contamination pouch 70 can be inhibited from exiting the contamination pouch 70.

Still further, in the transmission unit U in the embodiment, the contamination pouch 70 is formed so as to bridge over the carrier C and the differential case 20. Thus, the part of the contamination pouch 70 is formed not only in the differential case 20, but also in the carrier C. Therefore, a capacity of the contamination pouch 70 can be easily increased by utilizing the carrier C of the gear reducer R.

Moreover, between the carrier C and the differential case 20, at least the differential case 20 (and the carrier C as well in the embodiment) is recessed in the axial direction in the joining surface thereof with respect to the carrier C, whereby the contamination pouch 70 is defined between the carrier C and the differential case 20. Consequently, when processing or forming of the contamination pouch 70 is performed, it can be easily performed in the joining surface in a state where the carrier C is separated from the differential case 20 so as to make the joining surface widely open toward the outside. Therefore, even when a bottom part of the contamination pouch 70 is large in width and the inlet 70*i* is small in width, the processing or forming of the contamination pouch 70 can be quickly and accurately performed.

Still further, between the first and second cases 20A and 20B dividing and configuring the differential case 20, the first case 20A is provided with at least a part of the contamination pouch 70; and the second case 20B is provided the protruding part 70*k*. Thus, the protruding part 70*k*, which narrows the inlet 70*i* of the contamination pouch 70, can be easily formed in the second case 20B separated from the first case 20A. Consequently, processing or forming of the protruding part 70*k* can be significantly easily performed as compared to a structure in which the protruding part 70*k* is also formed in the first case 20A in addition to the contamination pouch 70.

In the differential case 20, as is apparent from FIGS. 1 and 9, the pinion gear support surface 20*pf* and the contamination pouch 70 are arranged at respective positions separated from each other in the circumferential direction of the differential case 20. This eliminates a possibility of reducing the thickness of the pinion gear support surface 20*pf* of the differential case 20, which supports the back surface of the pinion gears 23, for the purpose of forming the contamination pouch 70. Thus, even when the contamination pouch 70 is specially provided, the differential case 20 can achieve sufficient supporting rigidity for the back surface of the pinion gears 23.

Figure 10:
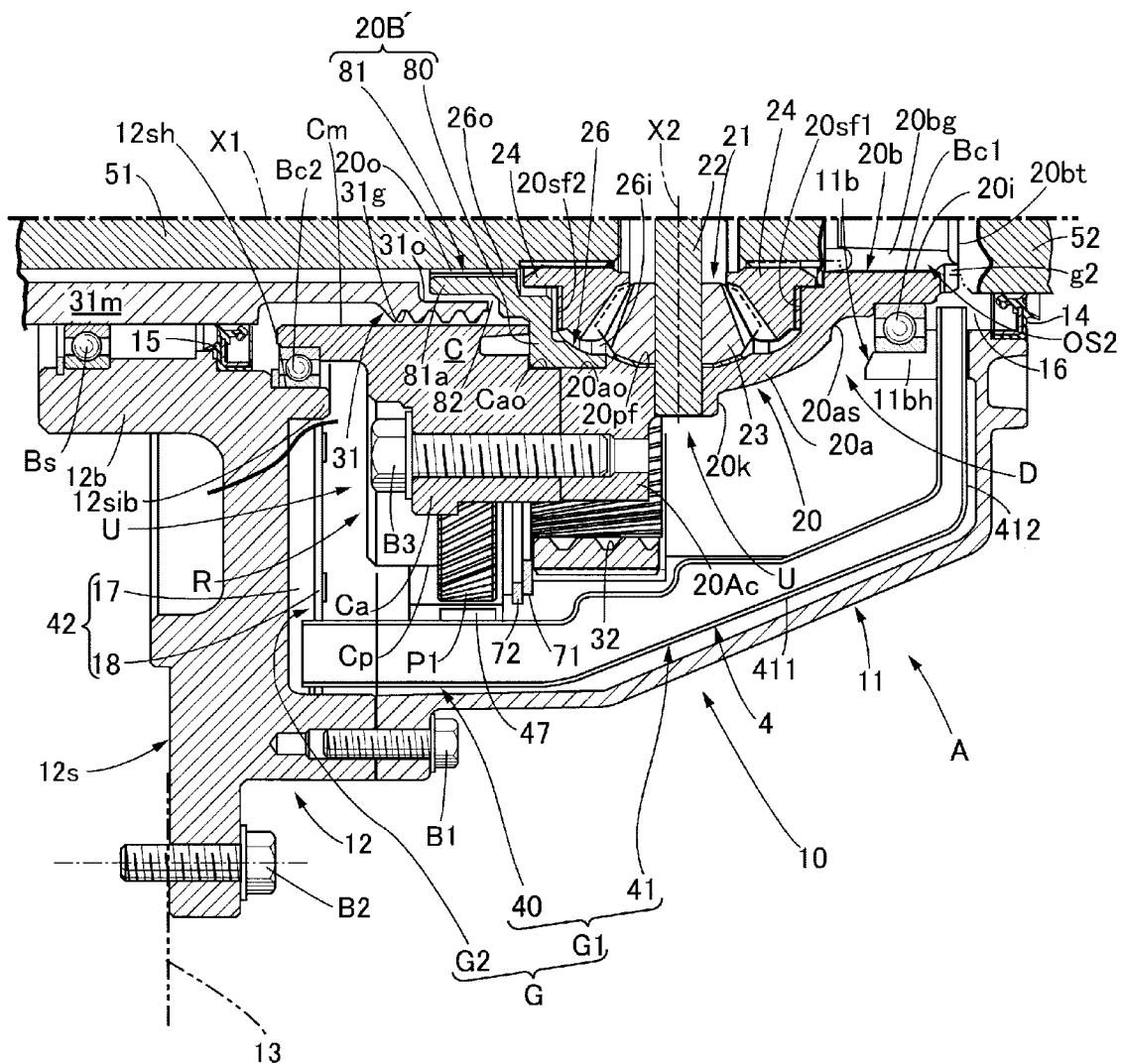
FIG. 10 is a sectional view showing a transmission device according to a second embodiment (the second embodiment) in correspondence with FIG. 2.
Figure 11:
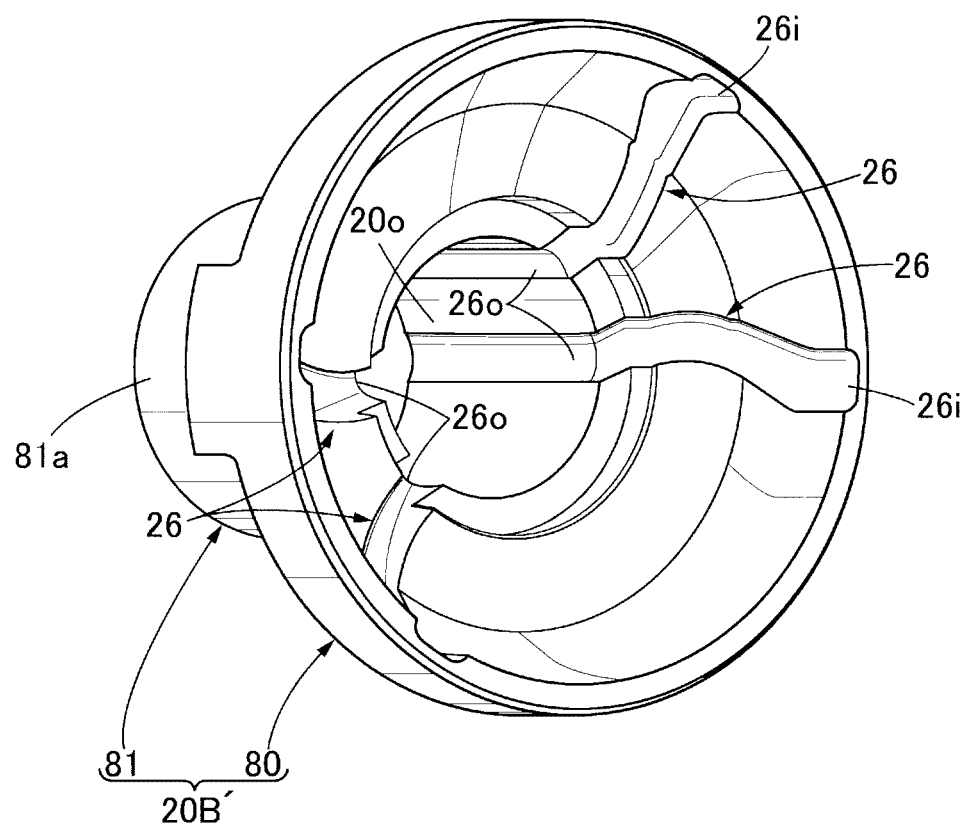
FIG. 11 is a perspective view of a second case according to the second embodiment (the second embodiment) in correspondence with FIG. 7.

FIGS. 10 and 11 show a second embodiment.

Second Embodiment

Although the outer surface of the second case 20B in the first embodiment is a planar surface with no protruding boss, a second case 20B' in the second embodiment is different from the first embodiment in that an outer surface thereof integrally includes a stepped boss part 81 protruding outward in the axial direction.

Specifically, the second case 20B' in the second embodiment includes a second case main part 80 configured substantially the same as the second case 20B in the first embodiment; and the stepped boss part 81 integrally provided to the outer surface of the second case main part 80 in a protruding manner. An inner surface of the second case main part 80 is provided with two or more oil grooves 26 in a depressed state as in the first embodiment. Second open ends 26*o* of the oil grooves 26 extend to a leading end of the boss part 81 vertically through an inner circumferential surface of the stepped boss part 81. An intermediate step part of an outer circumference of the stepped boss part 81 faces a leading end of the sun gear 31 in the axial direction with a gap provided there between. Moreover, a tip part 81*a* of the stepped boss part 81 with respect to the intermediate step part is loosely fitted to an annular recess part 31*o* provided in an inner circumference of a tip part of the sun gear 31. Between the tip part 81*a* and the annular recess part 31*o* of the sun gear 31, there is formed an annular oil path 82 always communicating with the internal space of the transmission case 10. An inner circumferential surface of the tip part 81*a* of the stepped boss part 81 forms the oil discharging port 20*o* of the differential case 20, and an annular gap between the oil discharging port 20*o* and the first output shaft 51 loosely penetrating the oil discharging port 20*o* communicates with the annular oil path 82. Accordingly, the oil that has reached the oil discharging port 20*o* from the inside of the differential case 20 (the body part 20*a*) through the oil grooves 26 flows out into the transmission case 10 through the annular oil path 82.

Although the cylindrical part 20At is provided in a protruding manner to the side wall 20*as* of the first case 20A in the first embodiment for attaching the parking gear 55 (the component) thereto, such a cylindrical part 20At for attaching a component is omitted in the second embodiment. It should be noted that the cylindrical part 20At for attaching a component is designed as necessary in accordance with a mode of use of the transmission device A, and may be omitted in, for example, the first embodiment and a third embodiment to be described below, or may be provided in the second embodiment.

Other configurations in the second embodiment are basically the same as those in the first embodiment and thus, each component in the second embodiment is merely denoted with the same reference numeral as the corresponding component in the first embodiment and a further description thereof is omitted. The second embodiment can also exhibit basically the same operations and effects as those of the first embodiment.

Figure 12:
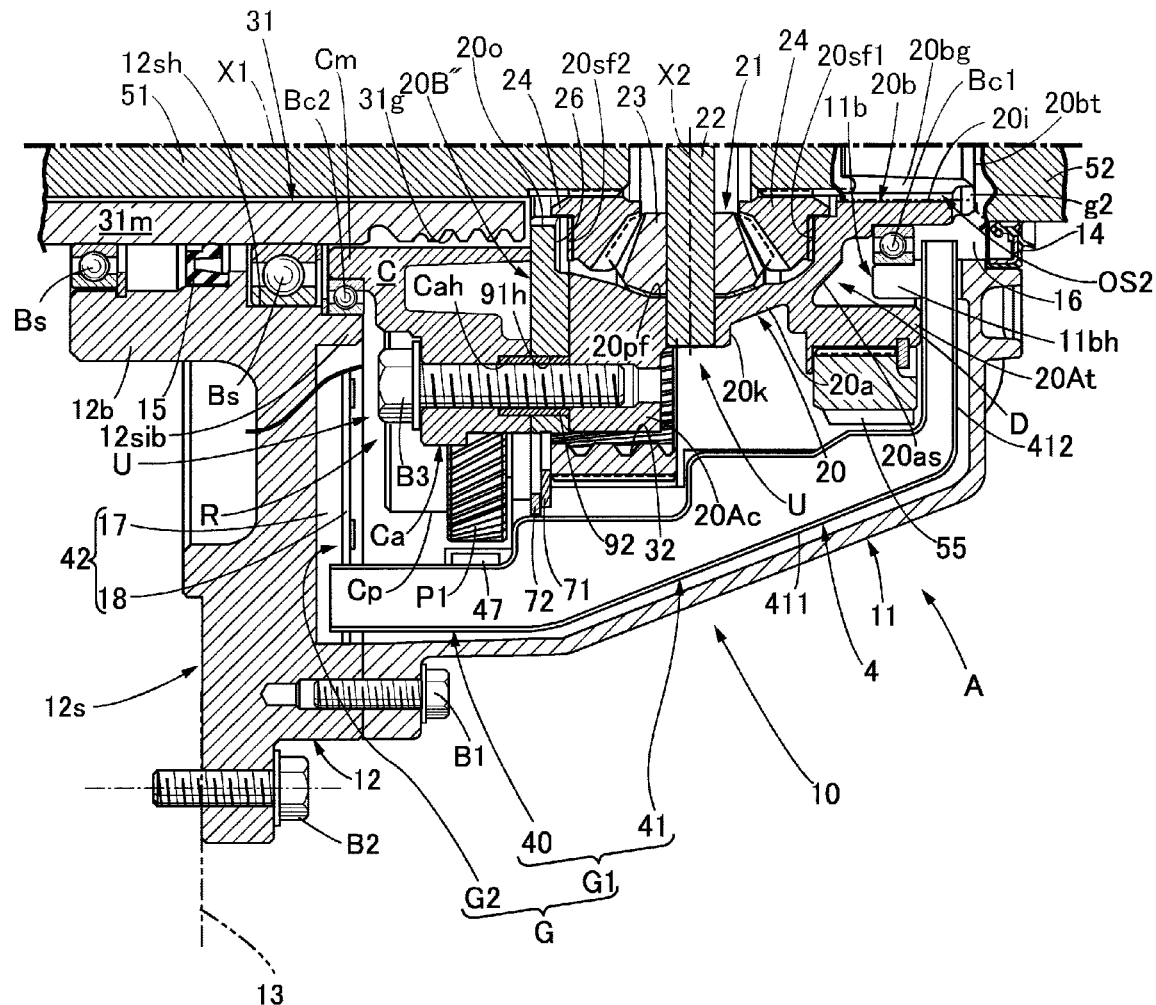
FIG. 12 is a sectional view showing a transmission device according to a third embodiment (the third embodiment) in correspondence with FIG. 2.
Figure 13:
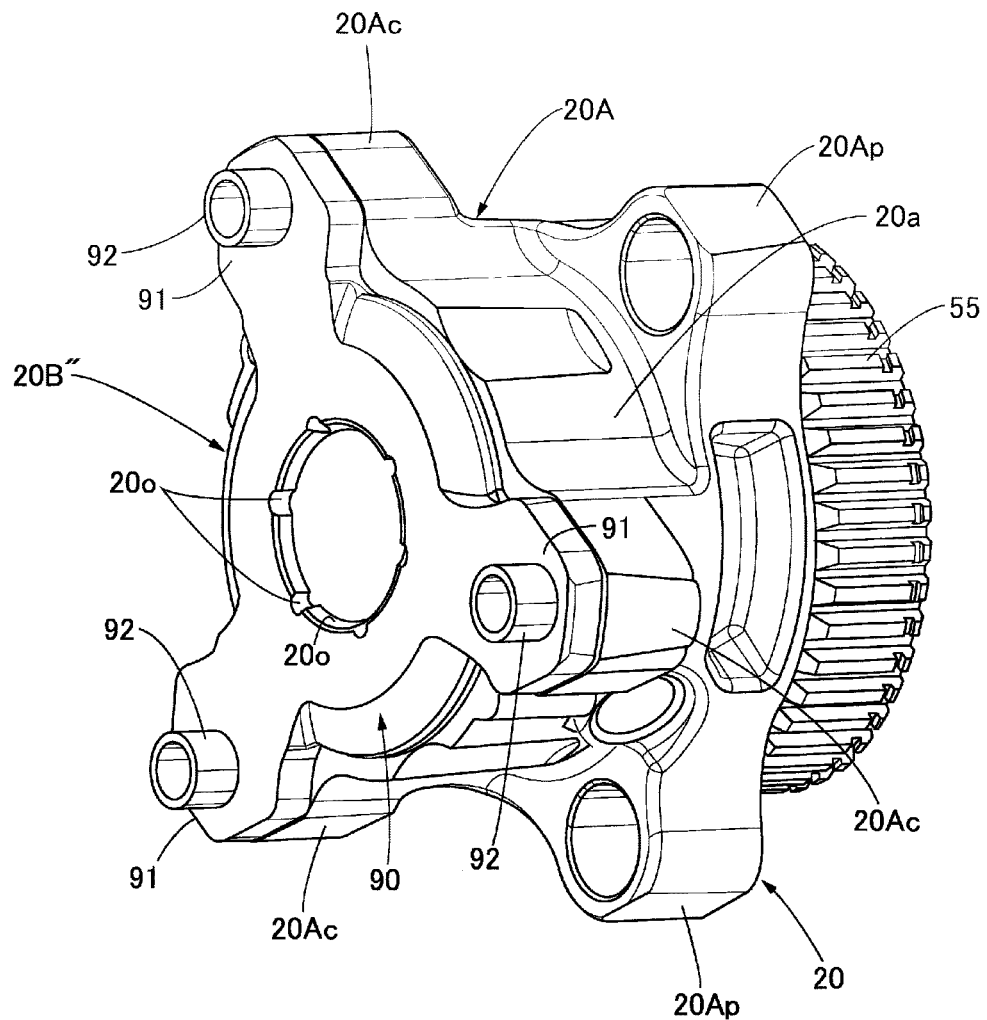
FIG. 13 is a perspective view of a differential case according to the third embodiment (the third embodiment).
Figure 14:
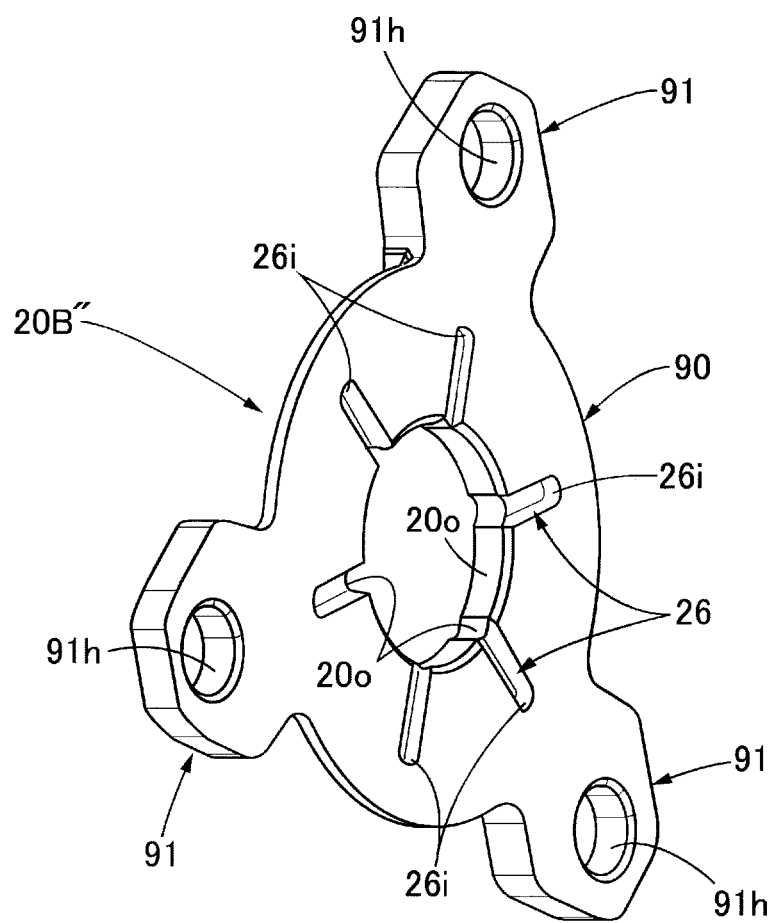
FIG. 14 is a perspective view of the second case alone according to the third embodiment as viewed from the inner side in the axial direction and obliquely from above (the third embodiment).

FIGS. 12 through 14 show a third embodiment.

Third Embodiment

A second case 20B" in the third embodiment is formed by a plate 90 having a flat and thin annular shape, and a through hole provided in a center part of this plate 90 forms the oil discharging port 20*o*. In an outer circumferential part of the plate 90, three attachment arm parts 91 are provided in a protruding manner at equal intervals in the circumferential direction. The three attachment arm parts 91 correspond to and are in the vicinity of respective three coupling arm parts 20Ac integrally provided in a protruding manner to the outer circumferential part of the first case 20A of the differential case 20.

The three attachment arm parts 91 are held between the three coupling arm parts 20Ac of the first case 20A and the three carrier arm parts Ca of the carrier C. Mutually-facing surfaces of the coupling arm parts 20Ac and the carrier arm parts Ca, which are holding surfaces, do not include the recess parts 20*ao* and Cao for positioning unlike in the first and second embodiments, and are rather simple planar surfaces. Instead, in order to set the second case 20B to a normal attachment position, a positioning pin 92 is fitted and inserted into a through hole 91*h* of each attachment arm part 91 and a through hole Cah of a corresponding one carrier arm part Ca so as to lay and extend across them. Thus, the bolts B3 penetrate through the carrier arm parts Ca and the positioning pins 92 and are screwed to the coupling arm parts 20Ac.

Other configurations in the third embodiment are basically the same as those in the first embodiment and thus, each component in the third embodiment is merely denoted with the same reference numeral as the corresponding component in the first embodiment and a further description thereof is omitted. The third embodiment can also exhibit basically the same operations and effects as in the first embodiment.

Although embodiments of the present invention have been described hereinabove, the present invention is not limited to the embodiments, and various design modifications may be made thereto without departing from the gist of the present invention.

For example, the above-described embodiments present the electric motor as an example of a power source to apply a rotational driving force to an input part (the sun gear 31)

of the transmission device A. In place of or in addition to the electric motor, an in-vehicle engine may be the power source.

The above-described embodiments present an example where the transmission device A is implemented in a transmission device for a vehicle (for example, an automobile) so as to distribute and apply the rotational driving force to the left and right driving wheels of the vehicle with the differential device D in the transmission device A. In the present invention, however, the differential device D may be used as a center differential so as to distribute and apply the rotational driving force to front and rear driving wheels of the vehicle. Alternatively, the transmission device A of the present invention may be implemented in various mechanical devices other than vehicles as a transmission device combining the gear reducer R and the differential device D together.

The above-described embodiments present an example in which the large-diameter gear parts P1 and the small-diameter gear parts P2 of the planetary gears P are an integrated component. However, a planetary gear part coupling body whose large-diameter gear parts P1 and small-diameter gear parts P2 are integrated with each other, and the pivot shafts 33 may be separate components. In this case, the planetary gear part coupling body is fitted to and supported by the pivot shafts 33 in a freely rotatable manner.

The invention claimed is:

1. A transmission device comprising:
a transmission case; and
a differential device whose differential case rotates inside the transmission case,
the differential case including:
a body part housing a differential mechanism therein and capable of storing an oil;
an oil introducing port open to a first side in an axial direction of the differential case and capable of introducing the oil inside the transmission case into the body part; and
an oil discharging port open to a second side in the axial direction of the differential case and capable of discharging a stored oil inside the body part into the transmission case, the second side being opposite to the first side in the axial direction,
the differential case comprising at least a part of a contamination pouch including an inlet facing into the body part and capable of collecting a contamination in the oil inside the body part,
in an inner surface of the differential case, the inlet being arranged in a largest inner diameter part on which a largest centrifugal force acts during rotation of the differential case, or arranged closer to the oil discharging port with respect to the largest inner diameter part in the axial direction, and
wherein a peripheral part of the inlet is provided with a protruding part closing a part of the inlet.

2. The transmission device according to claim 1,
wherein the differential case is coupled to a carrier of a gear reducer for outputting a rotational force to the differential case, and
wherein the contamination pouch is formed so as to bridge over the carrier and the differential case.

3. The transmission device according to claim 2,
wherein the differential mechanism comprises:
paired side gears rotatably supported by the differential case;
two or more pinion gears meshing with the paired side gears; and
a pinion gear support surface formed in an inner surface of the differential case so as to support back surfaces of the two or more pinion gears, and
wherein the pinion gear support surface and the contamination pouch are arranged at respective positions spaced apart from each other in a circumferential direction of the differential case.

4. The transmission device according to claim 2,
wherein the oil introducing port has a first diameter, and
wherein the oil discharging port has a second diameter larger than the first diameter.

5. The transmission device according to claim 1,
wherein the differential case is coupled to a carrier of a gear reducer for outputting a rotational force to the differential case,
wherein, between the carrier and the differential case, at least the differential case is recessed in the axial direction in a joining surface thereof with respect to the carrier to thereby define the contamination pouch between the carrier and the differential case.

6. The transmission device according to claim 5,
wherein the differential mechanism comprises:
paired side gears rotatably supported by the differential case;
two or more pinion gears meshing with the paired side gears; and
a pinion gear support surface formed in an inner surface of the differential case so as to support back surfaces of the two or more pinion gears, and
wherein the pinion gear support surface and the contamination pouch are arranged at respective positions spaced apart from each other in a circumferential direction of the differential case.

7. The transmission device according to claim 5,
wherein the oil introducing port has a first diameter, and
wherein the oil discharging port has a second diameter larger than the first diameter.

8. The differential device according to claim 1,
wherein the differential case is configured to be divided into first and second cases joined to each other, and
wherein at least a part of the contamination pouch is formed in the first case, and the protruding part is formed in the second case.

9. The transmission device according to claim 8,
wherein the differential mechanism comprises:
paired side gears rotatably supported by the differential case;
two or more pinion gears meshing with the paired side gears; and
a pinion gear support surface formed in an inner surface of the differential case so as to support back surfaces of the two or more pinion gears, and
wherein the pinion gear support surface and the contamination pouch are arranged at respective positions spaced apart from each other in a circumferential direction of the differential case.

10. The transmission device according to claim 2,
wherein the oil introducing port has a first diameter, and
wherein the oil discharging port has a second diameter larger than the first diameter.

11. The transmission device according to claim 1,
wherein the differential mechanism comprises:
paired side gears rotatably supported by the differential case;
two or more pinion gears meshing with the paired side gears; and a pinion gear support surface formed in an inner surface of the differential case so as to support back surfaces of the two or more pinion gears, and wherein the pinion gear support surface and the contamination pouch are arranged at respective positions spaced apart from each other in a circumferential direction of the differential case.

12. The transmission device according to claim 1, wherein the oil introducing port has a first diameter, and wherein the oil discharging port has a second diameter larger than the first diameter.

13. A transmission device comprising:

a transmission case; and a differential device whose differential case rotates inside the transmission case, the differential case including:

- a body part housing a differential mechanism therein and capable of storing an oil;
- an oil introducing port open to a first side in an axial direction of the differential case and capable of introducing the oil inside the transmission case into the body part; and
- an oil discharging port open to a second side in the axial direction of the differential case and capable of discharging a stored oil inside the body part into the transmission case, the second side being opposite to the first side in the axial direction, the differential case comprising at least a part of a contamination pouch including an inlet facing into the body part and capable of collecting a contamination in the oil inside the body part, in an inner surface of the differential case, the inlet being arranged in a largest inner diameter part on which a largest centrifugal force acts during rotation of the differential case, or arranged closer to the oil discharging port with respect to the largest inner diameter part in the axial direction, wherein the differential mechanism comprises:

paired side gears rotatably supported by the differential case;

two or more pinion gears meshing with the paired side gears; and a pinion gear support surface formed in an inner surface of the differential case so as to support back surfaces of the two or more pinion gears, and wherein the pinion gear support surface and the contamination pouch are arranged at respective positions spaced apart from each other in a circumferential direction of the differential case.

14. The transmission device according to claim 13, wherein the oil introducing port has a first diameter, and wherein the oil discharging port has a second diameter larger than the first diameter.

* * * * *